US011887316B2

(12) United States Patent
Sun et al.

(10) Patent No.: US 11,887,316 B2
(45) Date of Patent: Jan. 30, 2024

(54) MOTION TAXONOMY FOR MANIPULATION EMBEDDING AND RECOGNITION

(71) Applicant: University of South Florida, Tampa, FL (US)

(72) Inventors: Yu Sun, Tampa, FL (US); David Andres Paulius, Tampa, FL (US); Maxat Alibayev, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 202 days.

(21) Appl. No.: 17/373,276

(22) Filed: Jul. 12, 2021

(65) Prior Publication Data

US 2022/0012901 A1     Jan. 13, 2022

Related U.S. Application Data

(60) Provisional application No. 63/050,399, filed on Jul. 10, 2020.

(51) Int. Cl.
 *G06T 7/246*      (2017.01)
 *G06V 20/40*     (2022.01)
(52) U.S. Cl.
 CPC .............. *G06T 7/248* (2017.01); *G06V 20/41* (2022.01); *G06V 20/46* (2022.01); *G06T 2207/10016* (2013.01); *G06T 2207/30241* (2013.01)
(58) Field of Classification Search
 None
 See application file for complete search history.

(56) References Cited

U.S. PATENT DOCUMENTS

| 2007/0255454 A1* | 11/2007 | Dariush | G06N 3/008 |
| | | | 700/245 |
| 2011/0040405 A1* | 2/2011 | Lim | B25J 9/1664 |
| | | | 700/245 |
| 2011/0182469 A1* | 7/2011 | Ji | G06V 40/20 |
| | | | 382/103 |

OTHER PUBLICATIONS

Robot learning manipulation action plans by watching unconstrained videos from the world wide web, by Yang et al., Proceedings of the Twenty-Nine AAAI conference on Artificial Intelligence, pp. 3686-3692 (Year: 2015).*
Functional analysis of grasping motion, by Dai et al., 2013 IEEE/RSJ International conference on intelligent robots and systems, Nov. 3-7, 2013 (Year: 2013).*
Alibayev et al., Estimating Motion Codes from Demonstration Videos, arXiv:2007.15841v1, Jul. 31, 2020, 6 pages.
(Continued)

Primary Examiner — Vikkram Bali
(74) Attorney, Agent, or Firm — Quarles & Brady LLP

(57) ABSTRACT

A method for motion recognition and embedding is disclosed. The method may include receiving a plurality of frames of an input video for extracting a feature vector of a motion in the plurality of frames, generating a plurality of sets of one or more motion component bits based on the feature vector and a plurality of classifiers, the plurality of sets corresponding to the plurality of classifiers, each set of one or more motion component bits representing a physical or mechanical attribute of the motion; and generating a motion code for a machine to execute the motion by combining the plurality of sets of one or more motion component bits. Other aspects, embodiments, and features are also claimed and described.

21 Claims, 15 Drawing Sheets

(56) References Cited

OTHER PUBLICATIONS

Alibayev et al., Developing Motion Code Embedding for Action Recognition in Videos, arXiv.2012.05438v1, Dec. 10, 2020, 8 pages.

Borras et al., A Whole-Body Pose Taxonomy for Loco-Manipulation Tasks, in 2015 IEEE/RSJ International Conference on Intelligent Robots and Systems (IROS), pp. 1578-1585.

Feix et al., The Grasp Taxonomy of Human Grasp Types, IEEE Transactions on Human-Machine Systems, 2016, 46(1):66-77.

Liu et al., A Taxonomy of Everyday Grasps in Action, in 2014 IEEE-RAS International Conference on Humanoid Robots, pp. 573-580.

Paulius et al., Manipulation Motion Taxonomy and Coding for Robots, arXiv:1910.00532v1, Oct. 1, 2019, 6 pages.

Paulius et al., A Motion Taxonomy for Manipulation Embedding, arXiv:2007.06695v1, Jul. 13, 2020, 9 pages.

\* cited by examiner

*Axis K* vs. tool's principal axis y (loosen screw) X-Y view)

MOTION TAXONOMY FOR MANIPULATION EMBEDDING AND RECOGNITION

STATEMENT OF GOVERNMENT SUPPORT

This invention was made in part with government support under Award Numbers 1421418, 1560761, and 1910040 awarded by the National Science Foundation (NSF). The government has certain rights in the invention.

TECHNICAL FIELD

The technology discussed below relates generally to video recognition processing, and more particularly, to motion embedding of manipulations.

BACKGROUND

In several fields, including robotics and AI, motion recognition is a helpful task that contributes to a computational devices' understanding of the intent of humans, and learning manipulations directly from demonstration. However, in order for computers and other machines to "learn" to recognize manipulations in activities of daily living (ADL), it is helpful if the motions or actions are properly defined for use in classifiers. However, it can be challenging to appropriately define or describe motions in a way that is readily understood and "learnable" by machines. What are needed are systems and methods that address one or more of these shortcomings.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for motion recognition and embedding is disclosed. The method may include receiving a plurality of frames of an input video for extracting a feature vector of a motion in the plurality of frames, generating a plurality of sets of one or more motion component bits based on the feature vector and a plurality of classifiers, the plurality of sets corresponding to the plurality of classifiers, each set of one or more motion component bits representing a physical or mechanical attribute of the motion; and generating a motion code for a machine to execute the motion by combining the plurality of sets of one or more motion component bits.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

In FIG. 3a, the trajectory's points lie on a plane, thus suggesting that this is a 2D prismatic motion. In FIG. 3b, which shows a histogram of the number of velocity vectors and their similarity to each PC according to some embodiments.

FIG. 4a shows how the axis vector K in dotted lines, which is obtained from rotation matrices, aligns with the tool's principal axis y in straight lines at each trajectory point. This is further supported by FIG. 4b, which compares each frame's axis K to the tool's principal axes with cosine similarity. FIG. 4c graphs the change in rotation about each axis with respect to the last frame's orientation. FIGS. 4b and 4c suggest rotation about the y-axis, hence making it a 1D revolute motion.

FIGS. 6A-6F shows the 2D projection of vectors as a result of t-SNE from: FIG. 6a motion codes with more weight on contact features, FIG. 6b motion codes with higher weight on trajectory features, FIG. 6c motion codes with regular Hamming distance, and Word2Vec embedding from FIG. 6d Concept-Net, FIG. 6e Google News, and f) Wikipedia 2018. Certain examples of motions that do not share mechanical equivalences or similarities in FIG. 6d-FIG. 6f are highlighted in circle, and clusters of similar motions produced by motion codes in FIG. 6a and FIG. 6b, which use weights to determine distances.

DETAILED DESCRIPTION

Figure 1:
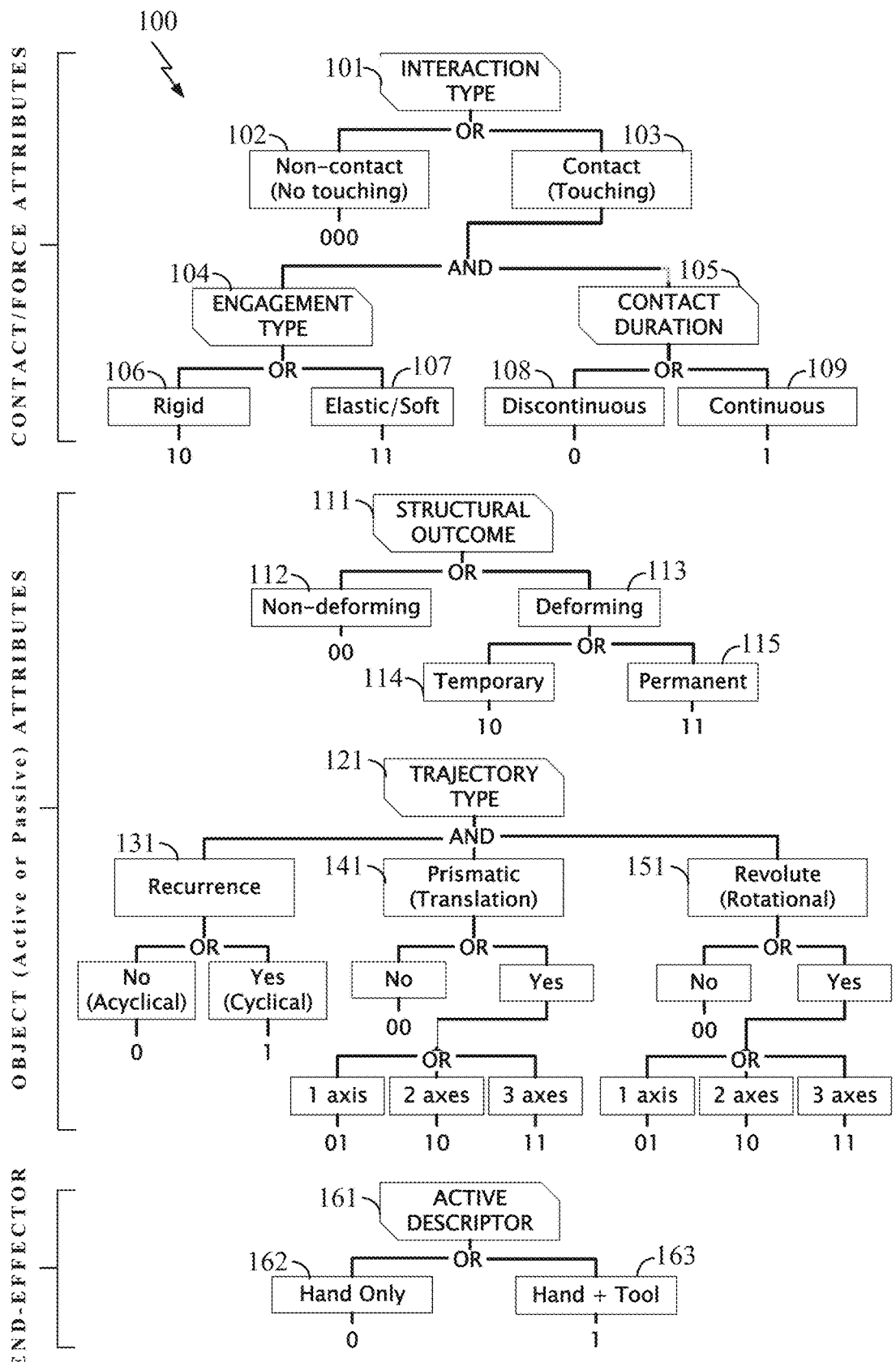
FIG. 1 is an illustration of an example of a hierarchy of attributes in the motion taxonomy using a motion according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

I. Introduction

To represent motions from a mechanical point of view, motion encoding using a manipulation motion taxonomy is explored. With this taxonomy, manipulations can be described and represented as binary strings called motion codes. Motion codes capture mechanical properties, such as contact type and trajectory, which should be used to define suitable distance metrics between motions or loss functions for deep learning and reinforcement learning. Motion codes can also be used to consolidate aliases or cluster motion types that share similar properties. Using existing data sets as a reference, this disclosure discusses how motion codes can be created and assigned to actions that are commonly seen in activities of daily living based on intuition as well as real data. Motion codes are compared to vectors from pre-trained Word2Vec models, and this disclosure shows that motion codes maintain distances that closely match the reality of manipulation.

In robotics and AI, motion recognition is an important component to the understanding of the intent of humans and learning manipulations directly from demonstration. In learning to recognize manipulations in activities of daily living (ADL), it is helpful to define motions or actions for use in classifiers. However, it is very difficult to appropriately define or describe motions—which a person describes in human language in words—in a way that is understood by robots.

In some embodiments, motion recognition is achieved using classifiers, such as neural networks, to detect actions in sequences of events. Networks can be trained using one-hot vectors (for each motion class) for motion recognition; however, distances between motions—i.e. distinguishing what makes one motion different to another—are not innately measurable with such vectors. However, word embedding can allow systems to obtain a better vectorized representation of human language describing those actions, which can then be used to draw meaningful relationships in a high-dimensional space. Essentially, words can be measured against one another for a variety of tasks, and they have been applied to affordance learning and grounding. One approach to learn embedding directly from natural language is Word2Vec. However, the major drawback to Word2Vec, when applied in classifiers for motion recognition and analysis, is that vectors have no innate sense of mechanics or functionality required to execute those motions since they are trained on text. A similar argument is made in other works that also consider embedding derived directly from manipulations over Word2Vec. To elaborate further, with Word2Vec embedding, the difference between two types of actions might not be properly explained. The difference may or may not share overlapping features, as distances between vectors are not functionally valid. An example is the labels 'pour', 'tap', and 'poke'; when comparing them in pairs, with a pre-trained Word2Vec from Wikipedia, the labels 'pour' and 'tap' are closer to one another than 'tap' and 'poke', where the latter is considered to be mechanically closer. Furthermore, Word2Vec embedding cannot capture multiple meanings of words. In the prior example, the label 'tap' can also refer to the noun for a source of water, which possibly explains why it is deemed more similar to 'pour' than to 'poke.'

This disclosure may introduce a suitable embedding of manipulations that considers mechanics of manipulations (from the point of view of the robot) for measuring distances. Such a representation from the viewpoint of robots is important for robot learning and understanding. With suitable distance metrics, motion classifiers can better discern between motion types or, in the event of uncertainty, suggest similar yet accurate labels for activity understanding. This disclosure uses the term motion taxonomy for this representation. With regards to existing taxonomies in robotics, grasp taxonomies have proved to be extremely useful in robotic grasp planning and in defining grasping strategies. These studies further explored the dichotomy between power and precision grasps based on the way fingers secure objects contained within the hand. However, there are no taxonomies that primarily focus on the mechanics of manipulation motions—specifically contact and trajectory for each end-effector—for defining motions and suitable metrics for motion types. Such a taxonomy can also be used for consolidating motion aliases (i.e. words or expressions in human language) by representing them as binary codes, which may help to enforce grasp taxonomies for learning from demonstration. This taxonomy can be used in a deep neural network that takes a manipulation sequence as input and outputs a representation of the motion type in the form of a binary-encoded string or code. These codes can potentially be used for motion recognition, analysis, and generation. In terms of robotic manipulation, using binary codes as word vectors for motions is better than word embedding from natural language like Word2Vec. Furthermore, the taxonomy can be used in manipulation learning to identify skills that can be extended to other motions and to facilitate affordance learning similar to prior work. This disclosure may show how this taxonomy can be used to define a representation that properly defines distances by comparing projections of various motions from the taxonomical embedding of labels to those from existing pre-trained Word2Vec models.

Further, this disclosure proposes a motion embedding strategy known as motion codes, which is a vectorized representation of motions based on a manipulation's salient mechanical attributes. These motion codes provide a robust motion representation, and they are obtained using a hierarchy of features called the motion taxonomy. This disclosure developed and trained a deep neural network model that combines visual and semantic features to identify the features found in our motion taxonomy to embed or annotate videos with motion codes. To demonstrate the potential of motion codes as features for machine learning tasks, we integrated the extracted features from the motion embedding model into the current state-of-the-art action recognition model. The obtained model achieved higher accuracy than the baseline model for the verb classification task on ego-centric videos from the EPIC-KITCHENS dataset.

Thus, the disclosure introduces motion embedding using motion codes, which are a vectorized representation of manipulations in an attribute space that describes mechanical and physical features, as a solution to the disparity between representations. Such features mainly fall under trajectory and contact descriptors. Motion codes are created using a hierarchy of features akin to a decision tree known as the motion taxonomy. The motion taxonomy outlines five major components that are considered when building these codes. A classifier or model, such as a deep neural network used in this disclosure, can be trained to predict these features separately, thus allowing to embed motion features in an unsupervised fashion. This disclosure also proposes a prediction model that derives a motion code for each demonstration video in this way. The performance of this prediction model is evaluated, and this disclosure show how these features can improve verb classification accuracy.

II. Motion Codes

In this section, the various attributes that are used to represent manipulations as motion codes using the motion taxonomy are described. Briefly, the purpose of this taxonomy is to translate manipulations into a machine language for the purpose of motion recognition, analysis and generation. Here, a manipulation motion is defined to be any atomic action between active and passive objects; an active object is defined as a tool or utensil (or the combination of a robot's gripper or human hand and tool) that acts upon passive objects, which are objects that are acted upon as a result of motion. Motions can be effectively embedded as vectors that relates them to motion feature space. Motions labelled with motion codes avoid ambiguity from aliases for motion types, especially when translating between human languages.

A. An Example for the Motion Taxonomy

Deriving a representation of motions using the motion taxonomy was partially inspired by our own experiences with annotating labels for robot knowledge. Among several annotators, inconsistency of labelling and defining motions was prevalent. This happens especially with certain motion types that are hard to discern (such as deciding between the labels 'cut', 'slice' or 'chop'), which requires revisiting all labels given to videos to ensure consistency. Furthermore, this is also a problem encountered when using annotated data sets such as the MPII Cooking Activities Dataset or EPIC-KITCHENS since they may have their own labels that may not overlap with each other. In some cases, labels can be very ambiguous and could be better described when adopting data sets for affordance learning. For instance, in EPIC-KITCHENS, one verb class provided is 'adjust', which turns out to encompass several actions such as tapping, poking, pressing or rotating depending on types of switches; another example is the 'insert' class, which encompasses actions such as pouring to picking-and-placing.

To potentially resolve these issues, a representation scheme that deviates from natural language may be proposed since an effective representation is important for robot learning. Binary-encoded strings called motion codes will inherently define motions based on key traits defined in the taxonomy. Ambiguity in human language labels or classes can be better handled if the human language labels or classes are represented in an attribute space, especially if these can be automatically obtained from demonstration. Different from this representation, neural networks that are used for motion recognition can encode motion labels using one-hot vectors. When training such networks, the cross entropy loss function may be used, which is defined as: $L = -\Sigma_{k=1}^{N} x_k \log \hat{x}_k$, where N is the total number of classes, $x_k$ is the ground-truth distribution, and $\hat{x}_k$ is the predicted distribution. For instance, if we have three labels 'pour', 'sprinkle', and 'cut', these may be encoded with vectors [1; 0; 0], [0; 1; 0], and [0; 0; 1] respectively; during the prediction stage, we can predict the label for a given manipulation sequence with the highest confidence using this equation. Since cross entropy is used to determine how close predicted distributions are to the actual distribution using one-hot vectors, distances between classes would not matter since one-hot vectors are equidistant from one another. Although this can be considered as a distance metric between probabilities, this does not consider class features that can provide a better label for class instances. Following the prior example, there is no similarity between motions: pouring and sprinkling can be considered as closer motions than to cutting in terms of manipulation mechanics.

With Word2Vec embedding, cosine distances between vectors suggest relatedness between word labels, where relatedness is determined by context. These models are trained either using continuous bag-of-words (CBOW), n-grams or skip-grams to identify word pairs that are frequently used or seen together. However, these vectors do not explicitly define why motions differ, which is one key purpose of motion codes; since Word2Vec derives vectors for singular words, there are issues when defining variations of motions. For example, pushing a solid or rigid object is mechanically different to pushing a soft object since the object we are pushing changes in shape, but these variations with Word2Vec cannot be represented. With motion codes, characterization of motions can be more descriptive. It is important to note that the proposed motion taxonomy is not claimed to be the ideal way of representing motions; rather, it can be used to tentatively reduce the amount of features needed to label and compute meaningful distances between motions.

1. Examining Characteristics of Motion Codes

The mechanics of motions can be broken down into contact, force and trajectory. Hence, the taxonomy considers the following attributes based on contact and trajectory information: contact interaction type 101, engagement type 104, contact duration 105, trajectory type 121 and motion recurrence 131. Motion codes also indicate whether the active object is solely a hand/gripper 162 or if it is a combination of a hand or tool 163. Motion codes can be defined for each end-effector used in the manipulation. When considering contact, the disclosure examines whether objects used in the manipulation make contact with one another and the disclosure describes what happens to these objects when this contact is established. These features 100, shown in FIG. 1, are further described below. FIG. 1 illustrates an example of a hierarchy of attributes in the motion taxonomy using a motion code formed by appending contact features, the active object's structural bits, the passive object's structural bits, the active trajectory and passive trajectory bits, and a bit descriptor of the active object by following the tree.

2. Describing Contact Type and Features

Motion types can be classified as contact or non-contact interaction types 103, 102. Contact motion types 103 are those that require contact between an active object (i.e. the actor's hands or the object that is typically grasped in the actor's hands) and passive object(s) (i.e. the object(s) that is/are manipulated upon when in contact with an active object) in the work space. This disclosure may consider the hand or end-effector as a tool. Conversely, non-contact motion types 102 are those where no contact is established between active and passive objects or there is no force exerted upon passive objects. Contact 103 can be observed with vision (for instance, by the objects' borders or bounding boxes overlapping) or using force sensors mounted on objects. An example of a contact motion 103 is mixing, where the active tool makes contact with contents within a passive container. As for a non-contact motion 102, pouring is a prime example: when pouring from one container to another, the active container held in the hand is not required to make contact with the passive receiving container.

Once an object interacts with another through physical contact 103, we classify their engagement 104 as either rigid 106 or soft 107. Rigid engagement 106 is where an active object's interaction with passive objects does not result in deformation—i.e. their structure is not compromised or changed—, whereas soft engagement 107 is where objects deform as a result of the interaction or the objects allow admittance or are permeable. Furthermore, the structural integrity (or state) of the objects used in order to describe deformation can be considered. Active and passive objects can either undergo no deformation (nondeforming) or structural change (deforming). We consider the spreading with a knife, neither the knife nor the surface (like bread) incurs a significant change in their shape. Deformation can be further distinguished as temporary or permanent, which is attributed to an object's material or texture. For instance, when we squeeze a passive sponge object, it returns to its original shape, signifying that this motion temporarily deforms it. However, in the cutting example from before, this state change is permanent. Poking or tapping an object could be classified as soft engagement if we engage an elastic object.

In addition to the prior attributes, it may be useful to note whether the active tool makes persistent contact 105 with passive objects. If the actor only makes contact for a short duration in the manipulation, we consider that contact to be discontinuous 108; however, if the contact between the active tool and passive object is persistent, we consider that contact to be continuous 109. However, this perspective changes depending on what is considered to be the active object. If we consider the robot's hand to be the active tool only, then we can assume that once it is grasping a tool for manipulation, there would be continuous contact between the hand and the tool. This is why we consider the active tool to be either the hand 162 (if there is no tool acting upon other objects) or both the hand and tool as a unit 163 (if there are other objects in the manipulation). Contact duration 105 can be determined visually (by timing the overlap of bounding boxes, for instance) or physically with force sensors. For the sake of this work, the disclosure relies on demonstration videos to identify contact duration by intuition. In other examples, the contract duration is a predetermined period of time. In some example, in determining contact type and duration, visual features such as bounding boxes drawn over objects in-action derived from object detection models can calculate the duration of intersection between active and passive object boundaries.

3. Describing Trajectory of Motion

An object's trajectory 121 may be described as prismatic 141 (or translational), revolute 151 (or rotational), or both. Previously, the active object's observed trajectory may be encoded in motion codes, but this description have included the passive object's trajectory. Prismatic motions 141 are manipulations where the object is moved along a certain axis or plane of translation. Prismatic motions can be 1-dimensional (along a single axis), 2-dimensional (confined to a plane) or 3-dimensional (confined to a manifold space); this can be interpreted as having 1 to 3 DOF of translation. Revolute motions 151, on the other hand, are manipulations where the object is rotated about an axis or plane of rotation; a robot performing such motions would rely on revolute joints to execute manipulations of this nature. Similar to prismatic motions, revolute motions can also range from 1-dimensional to 3-dimensional motion (i.e. from 1 to 3 DOF of rotation); typically, revolute motions 151 are confined to a single axis of rotation in world space. A motion is not limited to one trajectory type 121, as these properties are not mutually exclusive; therefore, we can say that a motion can be prismatic-only 141, revolute-only 151, neither prismatic nor revolute or both prismatic and revolute 141, 151. From the perspective of the active object, an example of a prismatic-only manipulation 141 is chopping with a knife since the knife's orientation is usually fixed, while an example of a revolute-only motion 151 is fastening a screw into a surface using a screwdriver. However, a motion such as scooping with a spoon will usually require both prismatic and revolute movements 141, 151 to complete the action.

Also, a motion's trajectory can be described by its recurrence, which describes whether the motion exhibits repetitive behavior in the tool's movement. A motion can be acyclical or cyclical, which may be useful depending on the context of motion. For instance, mixing ingredients in a bowl may be repeated until the ingredients have fully blended together, or in the case of loosening a screw, the screwdriver will be rotated until the screw is completely out of the surface. Learned acyclical motions can be made cyclical simply by repeating them, which is a decision that can be left up to the robot during motion generation if it is not finished with its task or it failed to execute the manipulation successfully.

4. Translating Motions to Code

Now, how motion codes can be assigned to motions using the example of the cutting action can be discussed. Using the flowchart shown as FIG. 1, codes can be constructed in the following manner: first, whether the motion is contact or non-contact is ascertained. In cutting, the active knife object makes contact with the passive object, and so the contact branch will be followed. If the motion was better described as non-contact 102, then the code can start with the string '000'. Since there is contact 103, the code, then, describes the type of engagement between the objects and how long the contact duration is throughout the action. Following the example, the knife cuts through an object and maintains contact with it for the entirety of the manipulation, hence making it a soft engagement ('11') and with continuous contact ('1'). After describing contact 103, the code can describe the state of the active and passive objects after the manipulation occurs. In the example, the active object does not deform ('00') while the passive object deforms permanently since the knife cuts it into a different state ('11'). After describing the structural integrity of the objects, the code then describes their trajectories. When cutting an object, the active trajectory is typically a 1D prismatic motion as we swing the knife up and down and without any rotation ('00100'), while there is no passive trajectory ('00000'), as the passive object is usually immobile. If we are observing repetition in cutting, then we would assign the recurrent bit '1' instead of '0' in the active trajectory substring. Finally, we indicate whether the active object is solely the hand or hand/tool pair; in our example, we would assign it a bit of '1' since we have a hand and knife pairing as an active object. With all of these substrings, we end up with the single motion code '11100110010000001'.

A list of motion labels may be compiled. The list of motion labels can be found across several sources of manipulation data such as EPICKITCHENS, MPII Cooking Activities, FOON (inspired by our prior work on object affordance for robot manipulation), and Daily Interactive Manipulations (DIM). Table I shows their respective codes. Several motions can share the same motion code due to common mechanics, such as cutting and peeling since they are both 1D-prismatic motions 141 that permanently deform the passive objects. Also variations in manipulation can be accounted; for instance, certain motions like mixing and stirring can either temporarily deform 114 or permanently deform 115 the target passive object, which depends on its state of matter, or non-recurrent or recurrent variants of motion can be identified. It is important to note that motion codes can be assigned to each hand 163 or end-effector 163 used in a manipulation since they are not necessary to perform the same manipulation in the same action. For instance, when chopping items, usually it is necessary to hold the object in place with one hand and then use the knife to chop with the other. Because of this, the structural or state outcome 111 of performing those actions could be extrinsic to the actions; in the aforementioned example, the passive object deforms but it is not directly an outcome of just holding the object. In Table I, this can be simplified to the single-handed perspective of performing those actions.

Table I below shows motion codes for manipulations based on the taxonomy illustrated in FIG. 1. The attributes of each motion correspond to those observed in source demonstrations. These codes are classified based on FIG. 1. Motion codes are 17 bits long. Underlined substrings correspond to the active object. First three bits correspond to the interaction type, the next two bits correspond to the state of the active objects, the next two bits correspond to the state of the passive objects, the next five bits correspond to the trajectory type of the active objects, the next five bits correspond to the trajectory type of the passive objects, and the last bit corresponds to the recurrence of the motion. Thus, the 17 bits are comprised as: AAA-BB-CC-DDDDD-EEEEE-F where AAA indicates the interaction type, BB indicates the state of the active object, CC indicates the state of the passive object, DDDDD indicates the trajectory type of the active object, EEEEE indicates the trajectory type of the passive object, and F indicates the recurrence of the motion.

TABLE I

| Motion Code | Motion Types |
| --- | --- |
| 00000000001000001 | pour |
| 00000010100000001 | sprinkle |
| 10000000100000000 | poke, press (button), tap |
| 10100000000000000 | grasp, hold |
| 10100000001000010 | open/close (jar), rotate, turn (key, knob), twist |
| 10100000100000001 | spread, wipe |
| 10100000100001000 | move, push (rigid) |
| 10100000101001010 | flip (hand) |
| 10100000101001011 | flip (turner, spatula) |
| 10100001000000001 | spread, wipe (surface) |
| 10100000100000010 | open/close (door) |
| 10100001000010000 | move (2D), insert (placing), pick-and-place |
| 10100001000110011 | fasten, loosen (screw) |
| 10100001000110010 | shake (revolute) |
| 10100001010010100 | shake (prismatic) |

TABLE I-continued

| Motion Code | Motion Types |
| --- | --- |
| 110001000100000001 | dip |
| 110001000101001001 | scoop (liquid) |
| 110001100101001001 | scoop |
| 110110000100000001 | crack (egg) |
| 111000000100000001 | insert, pierce |
| 111001000000000000 | squeeze (in hand, elastic) |
| 111001000101001010 | fold, unwrap, wrap |
| 111001011000000001 | beat, mix, stir (liquid) |
| 111001100000000000 | squeeze (in hand) |
| 111001100100001000 | flatten, press, squeeze, pull apart, peel (hand) |
| 111001100100000001 | chop, cut, mash, peel, scrape, shave, slice |
| 111001100100100010 | roll |
| 111001101000000001 | saw, cut (2D), slice (2D) |
| 111001111000000001 | beat, mix, stir |
| 111100000100001001 | brush, sweep, spread (brush) |
| 111100001000010001 | brush, sweep (surface) |
| 111110000000001001 | grate |

B. Another Example for the Motion Taxonomy

Figure 2:
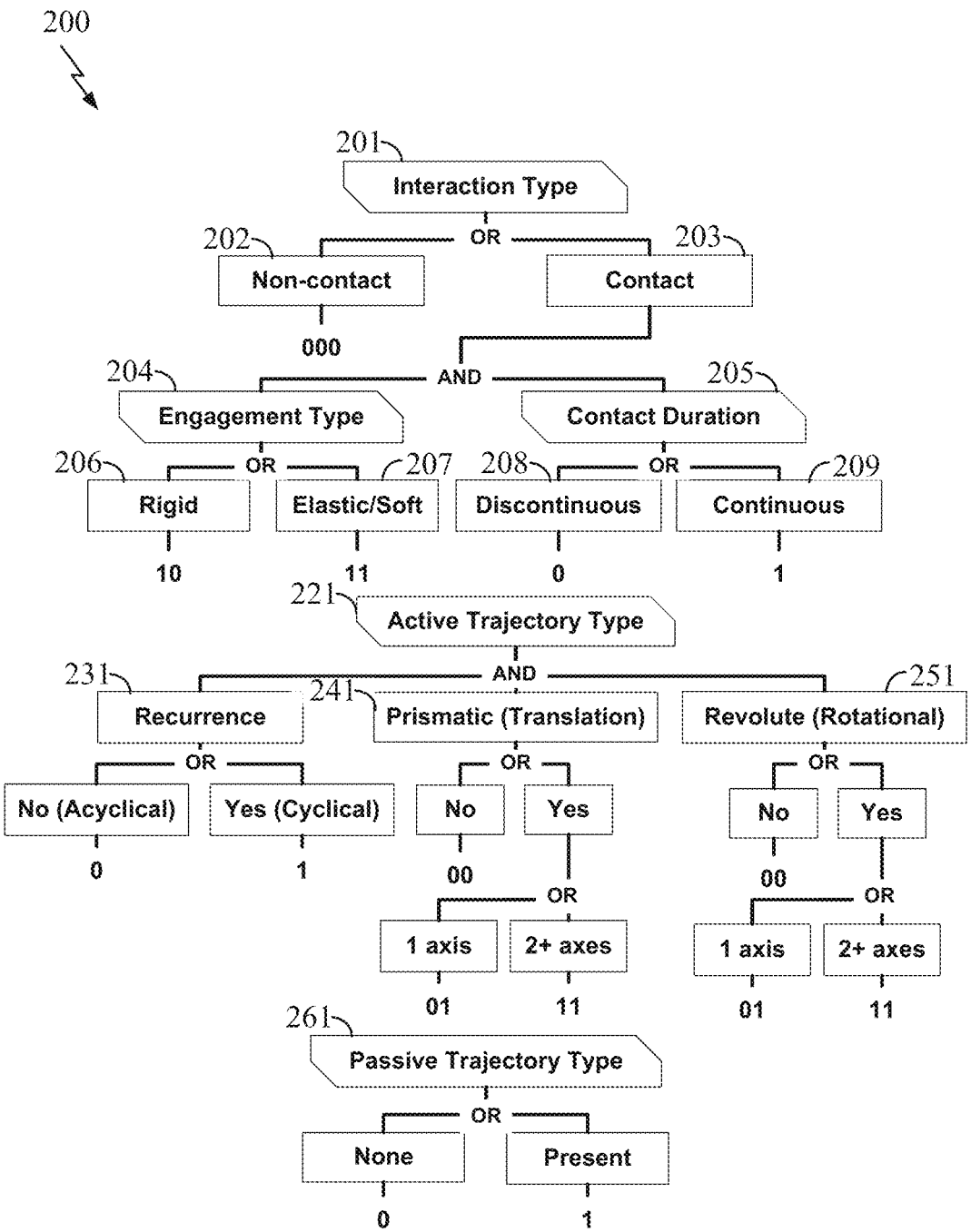
FIG. 2 is an illustration of an example of motion taxonomy using a motion code according to some embodiments.

In some examples, motion code embedding using the motion taxonomy may be defined. The motion taxonomy is a hierarchical categorization of physical and mechanical attributes that can be used to vividly describe manipulations in a manner that is useful to a robot. It incorporates several features, such as contact type 201 and motion trajectory 221, which can be used to visually distinguish motions from one another, which cannot be done using natural language. Overall, the motion taxonomy has five components that form a motion code, which are each represented as substrings: interaction type 201, active trajectory recurrence 231, active prismatic trajectory 241, active revolute trajectory 251, and passive trajectory type 261. All substrings are combined together to form a single motion code. A flowchart of the taxonomy featuring these components is illustrated in FIG. 2. FIG. 2 illustrates an examples of the motion taxonomy using a motion code formed by appending bits for contact features, the active object's trajectory, and the passive object's motion with respect to active object by following the tree.

When creating motion codes in some embodiments, it is important to note active and passive objects of action since many actions involve a pair of objects. An active object is defined as either the hand or the combination of a hand and tool/utensil that acts upon a passive object. A passive object is defined as any object that is being manipulated or acted upon by the active object. Motion codes are designed to describe a manipulation based on these concepts.

1. Describing Interaction

Any manipulation can be identified as either contact 203 or noncontact interaction 202. A contact manipulation 203 means that contact is established between active and passive objects-in-action; on the contrary, a non-contact manipulation 202 means that during the action, there is little to no contact made between the active and passive objects-in-action. Should a manipulation be identified as a contact manipulation, it can be further described by its engagement type 204 and the duration of contact made 205.

The engagement type 204 of a motion describes whether the action causes any change or deformation of state, shape, or structure among the objects-in-action or not. As such, there are two cases: rigid engagement 206 and soft engagement 207. In a rigid engagement motion 206, any deformation is not observed; an example of such a motion is picking or placing an object since neither the active hand object nor the passive object being moved will change in its structure. In a soft or elastic engagement motion 207, deformation is observed in either the active or passive object's structure; an example of this is peeling, where the passive object being peeled by an active peeler object will physically change.

Contact duration 205 describes how long contact persistently remains between the active and passive objects. The contact duration 205 may be defined as either continuous 209 or discontinuous contact 208. When assigning this bit, one can determine a threshold for the amount of time that is considered as continuous contact. This disclosure considers contact to be continuous when contact persists for about ~80% of the manipulation action.

2. Describing Trajectory

In robotics, motion trajectory is an important component to manipulation. For this reason, it is helpful to define manipulations while considering the trajectory 221 of the end-effector and objects-in-action. The active object-in-action trajectory 221 may mainly identify whether the trajectory exhibits prismatic 241 or revolute trajectory characteristics 251.

A motion's trajectory 221 is prismatic 241 if the active object is moved about or translated about an axis or place; specifically, the translation may be 1-dimensional (moving across a single axis), 2-dimensional (moving across a plane), or 3-dimensional (moving across a manifold space) prismatic trajectory 241. This is akin to having 1 to 3 degrees of freedom (DOF). The term prismatic refers to the prismatic joints used in robotics. A prismatic trajectory 241 can be observed in motions such as cutting, peeling, or pushing. On the other hand, a motion's trajectory 221 is revolute 251 if the active object's orientation is changed as needed for the manipulation; in other words, it is rotational motion. The term "revolute" refers to the revolute joints that a robot would rely upon to perform rotational motions. As with prismatic trajectory 241, a revolute trajectory 251 can range from 1 to 3 DOF. A revolute trajectory 251 can be observed in motions such as pouring or flipping. Together, prismatic 241 and revolute trajectories 251 describe position and orientation change of motion. An action may be only prismatic motion 241, only revolute motion 251, both prismatic and revolute motion 241, 251, or none, as these two types are not mutually exclusive. For our experiments, we simplified the definition of trajectory to have zero ('00'), one ('01'), or many DOF ('11'), since we are using egocentric videos.

A trajectory 261 with the passive object(s) in action may be described as whether or not the passive object moves with respect to the active object. We opted to do this as passive objects may simply move along with the active object (such as the case with a hand gripping an object); furthermore, it is already a challenge to automatically extract detailed trajectory features from demonstration videos.

Finally, a motion code describes if there is a recurrence 231 or any repetition in trajectory. A motion may be described as acyclical or cyclical. This may be important to note if a motion is not complete, or more importantly, if the robot did not successfully execute the motion. Motions such as mixing or stirring will typically exhibit repetition.

3. Building a Motion Code

With the taxonomy structure in FIG. 2 as a reference, one can assign motion codes to demonstrations in household tasks, such as cooking or assembly. Assuming a scenario of a person chopping a cucumber with a knife; here, the active object-in-action is the hand/knife combination, while the passive object-in-action is the cucumber. The idea is to identify the characteristics of the five components found in the flowchart. Since the knife must engage in contact with the cucumber to chop it into smaller units, this motion would be classified as a contact manipulation of soft engagement type ('11'). This contact may be considered as continuous contact since the knife must contact and touch the cucumber ('1').

Next, the trajectory of the motion can be described. First, with the active object, the knife is usually translated in a single direction in order to make slices or to divide the cucumber into portions. In cutting, there is typically no observable rotation, as slices are made evenly throughout the action. Therefore, the codes will have the bits '01-00' for prismatic and revolute trajectory respectively. If a demonstration where the knife is repeatedly chopping is observed, then there is recurrence ('1-01-00'); if not, then there is no recurrence ('0-01-00'). In terms of passive object motion, since the knife is moving while the cucumber is stationary, the cucumber is moving with respect to the active object, and so this motion is indicated with '1'. In all, a 9-bit motion code such as '111-0-01-00-1' describes a chopping demonstration.

Motion codes for other common cooking or household actions are featured in Table II. There is a many-to-many mapping between the motion codes and verbs. A single motion code can describe more than one verb, while one verb can be executed as different motions. For instance, in the example of cutting a cucumber, one scenario may exist where the actor is moving the knife perfectly along a single line. Hence, the motion has a prismatic trajectory with 1 DOF ('0-01-00'). However, Table I shows an example where the verb cut has prismatic trajectory with many DOF ('0-11-00'). Indeed, it canoe be determined whether there are 1 or 2 DOF in this action since it only depends on how the action was executed in the video. This example demonstrates how motion codes complement the semantic information that struggles to resolve the action ambiguity by offering a more visual perspective. Additionally, the motion code distances between manipulations from Table II reflect differences in mechanics and thus benefit from explainability.

Table II shows motion codes for common manipulations based on FIG. 2. Bits are separated by hyphens with respect to its component.

TABLE II

| Motion Code | Motion Verbs |
| --- | --- |
| 000-0-00-01-1 | pour |
| 000-1-01-00-1 | sprinkle |
| 100-0-01-00-0 | poke, press (button), tap, adjust (button) |
| 101-0-00-00-0 | grasp, hold |
| 101-0-00-01-0 | open/close (jar), rotate, turn (knob), twist |
| 101-0-01-00-0 | spread, wipe, move, push (rigid) |
| 101-0-01-01-0 | flip |
| 101-0-11-00-1 | open/close (door) |
| 101-1-00-01-0 | shake (revolute) |
| 101-1-01-00-0 | shake (prismatic) |
| 110-0-01-01-0 | scoop |
| 110-0-01-00-0 | crack (egg) |
| 111-0-01-00-0 | insert, pierce |
| 111-0-00-00-0 | squeeze (in hand, elastic) |
| 111-0-01-01-0 | fold, unwrap, wrap |
| 111-1-11-00-1 | beat, mix, stir (liquid) |
| 111-0-00-00-0 | squeeze (in hand, rigid) |
| 111-0-01-00-1 | flatten, press, squeeze, pull apart, peel, chop, cut, mash, peel, scrape, shave, slice |
| 111-0-01-00-0 | roll |
| 111-0-11-00-1 | saw, cut (2D), slice (2D) |
| 111-1-11-00-1 | beat, mix, stir |
| 111-0-01-00-1 | brush, sweep, spread (brush) |
| 111-0-11-00-1 | brush, sweep (surface) |
| 111-0-00-00-1 | grate |

III. METHODOLOGY

Having established the definition of the motion taxonomy and all properties it encompasses, the disclosure now discusses how to automatically obtain motion codes from video demonstrations.

A. An Example for Obtaining Motion Codes from Demonstration

Ideally, a neural network (or a collection of networks for a group of attributes) can be developed to output codes for different motion types. In detail, such a network structure would assign motion codes to a series of segmented actions as seen in demonstration videos; rather than learning to detect and output a single motion code, an ensemble of classifiers that can separately identify parts of the hierarchy in FIG. 1 can be used to build substrings that could then be appended together as a single, representative string. As a result of such a network structure, one could also obtain motion features that may facilitate motion recognition tasks.

Representing manipulations in an attribute space as motion codes can be likened to the idea behind zero-shot learning (ZSL); just as in ZSL, even if certain class instances are not known, motion code vectors can be used as a guide to assign codes to unknown manipulations and to possibly learn new actions, granted that we know how to execute similar actions.

1. Evaluation of the Taxonomy

Having understood the taxonomy and identified motion codes for manipulations in ADL, the disclosure demonstrates how suitable they are for representing motion labels. In particular, the disclosure focuses on how motion codes can produce embedding whose distances are meaningful based on their attributes. This evaluation is done in two parts: first, the disclosure shows how the motion code assignment corresponds to actual data. Second, the disclosure contrasts motion codes to the unsupervised word embedding method Word2Vec, which learns vectorized representations of words directly from natural language, to show that it is not suitable to derive accurate motion embedding. The example used pre-trained models trained on Google News, Wikipedia, and Concept-Net; although these are not solely trained with knowledge sources of manipulations nor physical properties, these models are commonly used for deep learning tasks in robotics, AI, and computer vision.

2. Support for Motion Codes

Preferably, motion codes are derived directly from demonstration data. Several modalities of data such as trajectory, force, and vision can be used to determine the attributes that best describe said manipulations. Using provided position and orientation data, which is available in data sets such as DIM, the trajectory type can be ascertained for several motions in which there is an active tool or object being manipulated.

Figure 3A:
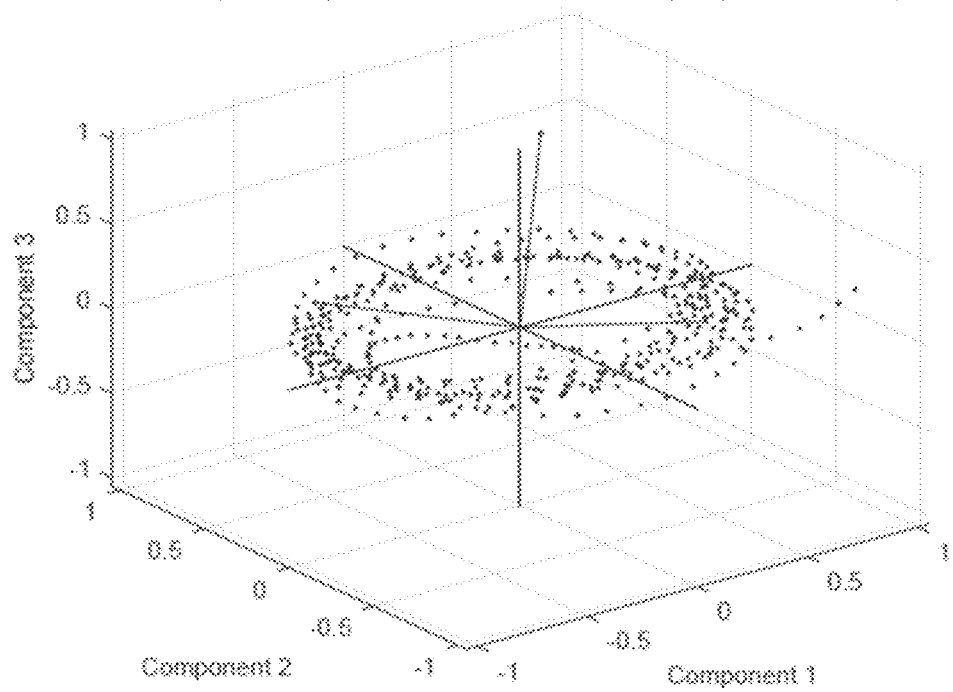
FIGS. 3A-3B is an illustration of an example of how principal component analysis (PCA) can be applied to recorded position data to derive prismatic bits for a 'stir' motion.
Figure 3B:
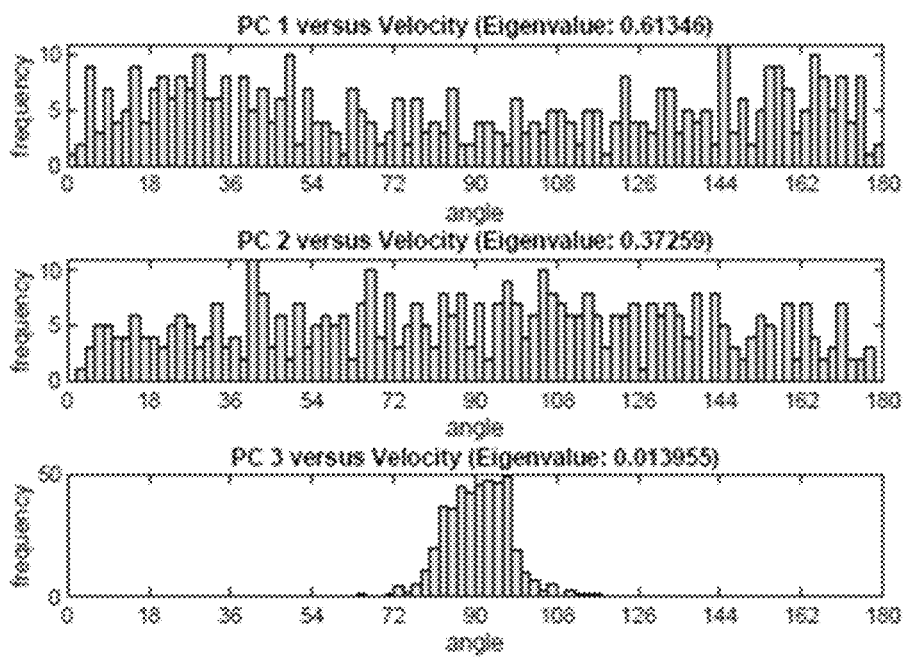

To determine the prismatic trajectory type, this example can use methods such as principal component analysis (PCA) to find the number of axes (which would be transformed into principal components, or PCs) that captures the most variance of the trajectory. PCA has been used for feature extraction and dimension reduction, where one can obtain a subset of features (i.e. DOF) that will sufficiently capture data. Here, this example considered that the number of DOF for a motion is reflected by the number of PCs that would capture about 90% of variance. Motions such as flipping with a turner are effectively 1D (and in minor cases 2D) motions because a single PC captures about 90% of the variance of those trials. Mixing, beating and stirring (which are all variations of the same motion) data confirm that the motion is 2D since both the 1st and 2nd PCs met our requirements; this can be observed in the projection shown as FIG. 3. FIG. 3 is an illustration of an example of how principal component analysis (PCA) can be applied to recorded position data to derive prismatic bits for the 'stir' motion. In FIG. 3a, the trajectory's points lie on a plane, thus suggesting that this is a 2D prismatic motion. In FIG. 3b, which shows a histogram of the number of velocity vectors and their similarity to each PC, it further supports that the motion primarily lies in PCs 1 and 2 (capturing ~99% of variance). It can also be observed from the projection that this trajectory is recurrent since the motion is cyclical. One can compare the derived PCs to the velocity (i.e. directional vectors between trajectory frames) to also clarify whether or not motions exist within those dimensions using cosine similarity. Should the velocity vectors align with the PCs, we would expect values closer to 0° or 180°. In FIG. 3b, not only does the 3rd PC contribute very little to capture the motion, but it is normal to velocity (since the histogram shows a prevalence of vectors with cosine similarity peaking around 90°).

Figure 4A:
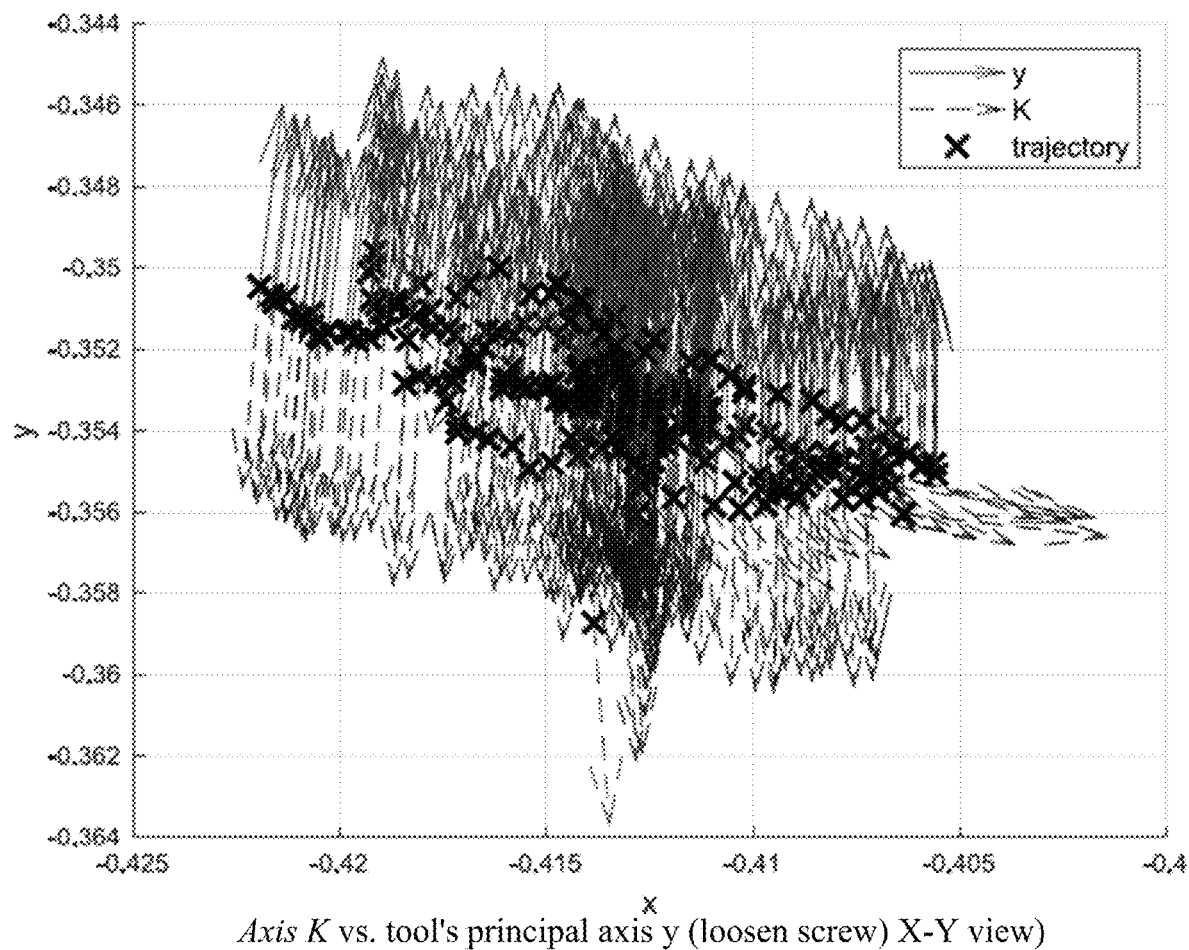
FIGS. 4A-4C is an illustration of an example of how an axis-angle representation can be used to identify revolute properties for the 'loosen screw' motion.
Figure 4B:
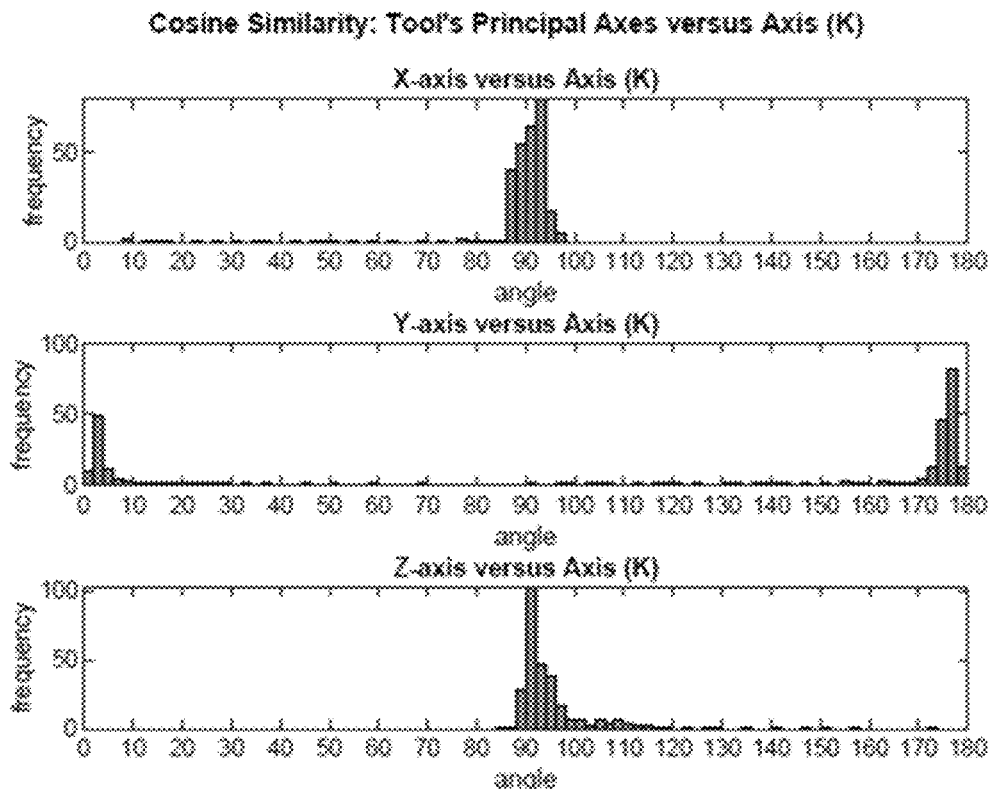
Figure 4C:
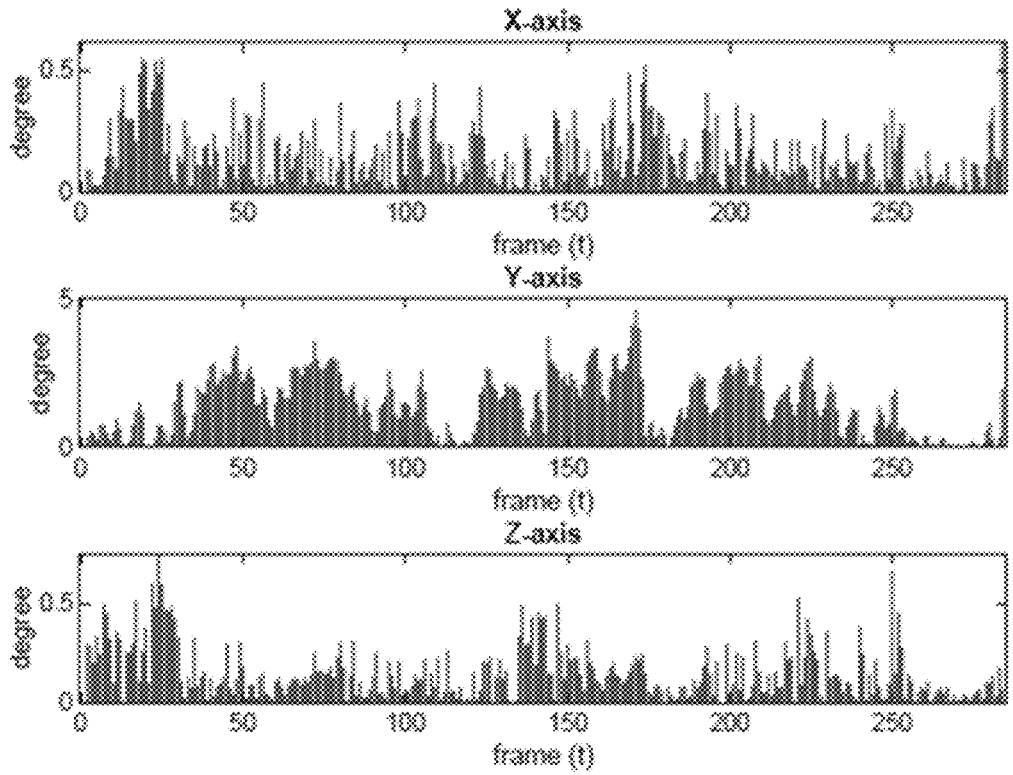
Figure 5:
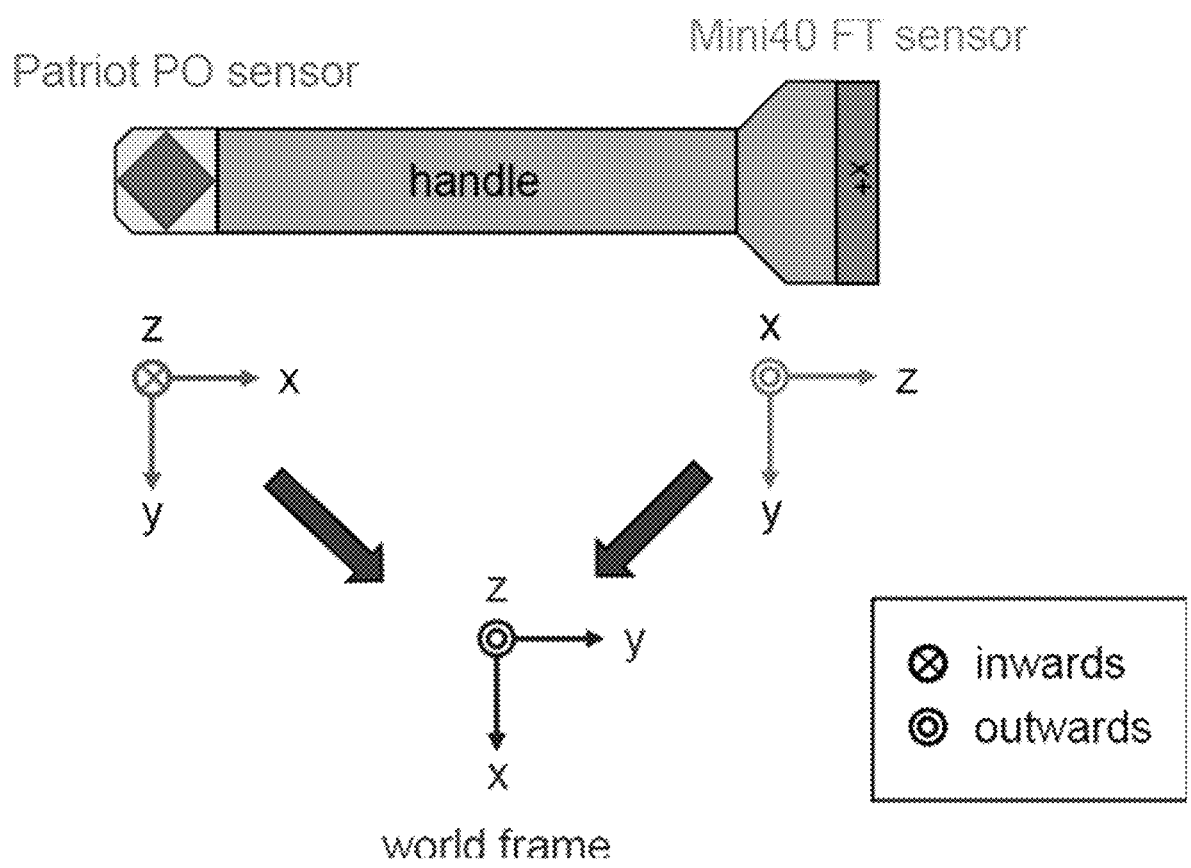
FIG. 5 is an illustration of adapter used for data collection in accordance with various systems and methods described herein. The Patriot sensor records position and orientation, while the ATI Mini40 sensor records force and torque. They are aligned to the world frame for analysis.

To determine the revolute trajectory type, the position and orientation data can be converted to rotation matrices and measure the amount of rotation about the principal axis of the active tool. The axis-angle representation (which represents a frame as a vector K and an angle of rotation $\theta$) derived from rotation matrices can also be used to compute the angle of rotation based on $\theta$. A significant rotation about this principal axis suggests that there is at least one axis of rotation. FIG. 4 illustrates how revolute properties can be extracted for the motion of loosening a screw. Given the tool's principal axes are defined as in FIG. 5, the operation of a screwdriver would require major rotation about the y-axis. In FIG. 4a, one can see that the axis vector K is predominantly pointing in the opposite direction of the tool's axis (which is also supported by FIG. 4b, which shows that the cosine similarity values peak at 0 or 180), suggesting that there is anti-clockwise (or negative) rotation. Rotation about this axis is further supported by FIGS. 4b and 4c.

3. Comparing Motion Codes to Word2Vec Embedding

How motion codes produce more ideal distances between motion types can be shown by how vectors from Word2Vec, which are derived from natural language, are not sufficient to represent manipulations for classification. As mentioned before, Word2Vec is an unsupervised method to derive multidimensional vectors for words in natural language processing tasks with neural networks. Typically, all words in a vocabulary are initialized as random vectors, whose distances are incrementally adjusted with respect to other word vectors. Words are related based on locality; that is to say, if one word is frequently seen among neighbors of that word in source text, then its vector along with its neighboring words' vectors will be closer to one another than those vectors representing other words in the vocabulary.

To compare motion codes to Word2Vec embedding, dimension reduction can be applied with PCA and then used t-SNE [30] to visualize these embedding and their relative distances in 2D. The t-SNE algorithm (short for t-distributed Stochastic Neighbor Embedding) is an approach that is often used to visualize high-dimensional representations or embedding, such as word vectors from Word2Vec, in a low-dimensional space. Although certain motions will be assigned the same code, the t-SNE algorithm will position their projected vectors in close yet non-overlapping positions; similar motions would be clustered near each other since t-SNE preserves local neighbors while keeping dissimilar motions far from one another. By default, the distances between the naturally occurring clusters are set further apart than by default, which is reflected by an early exaggeration value of 36 (as opposed to 12); in addition, the number of neighbors used to decide on placement, which is known as perplexity, was set to 12. Since word vectors from Word2Vec are associated with single words, vectors of functional variants of labels that we have listed in Table I cannot be found directly. For instance, the labels 'mix' and 'mix (liquid)' are different based on the permanence of deformation. To circumvent this limitation, some motions were substituted with other words, such as 'pick-and-place' to 'move', that may capture the meaning of the original label.

Figure 6A:
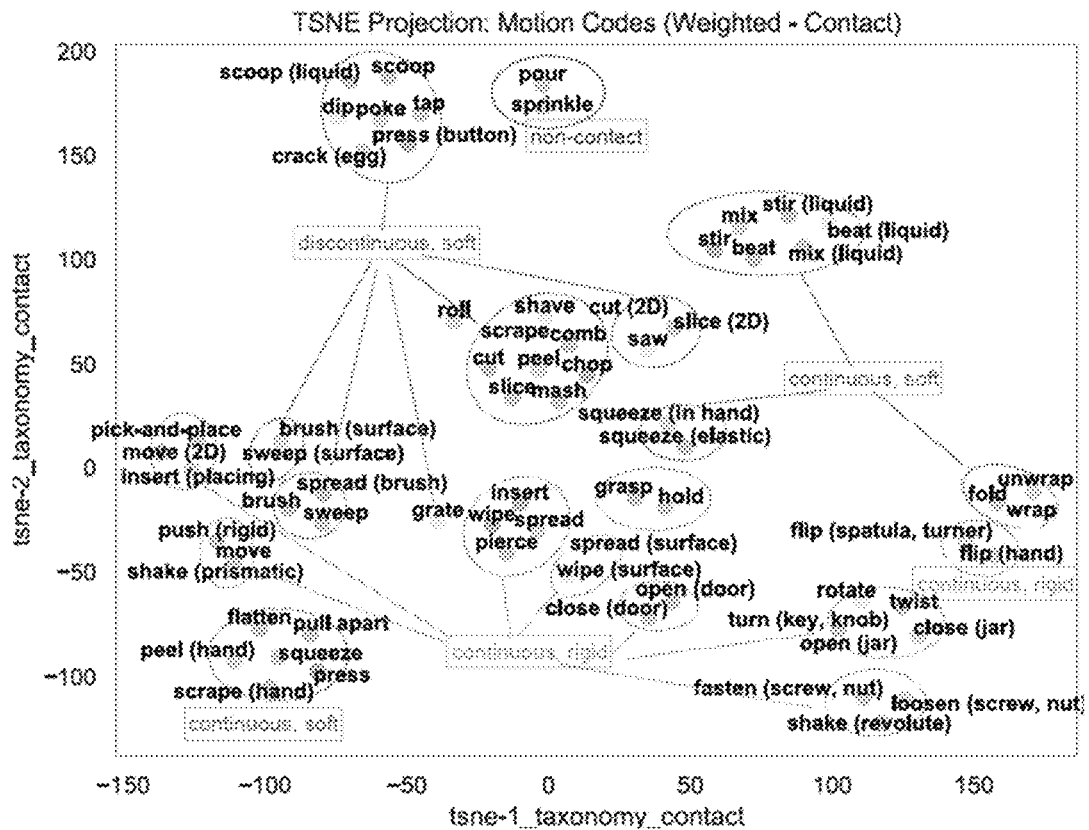
Figure 6B:
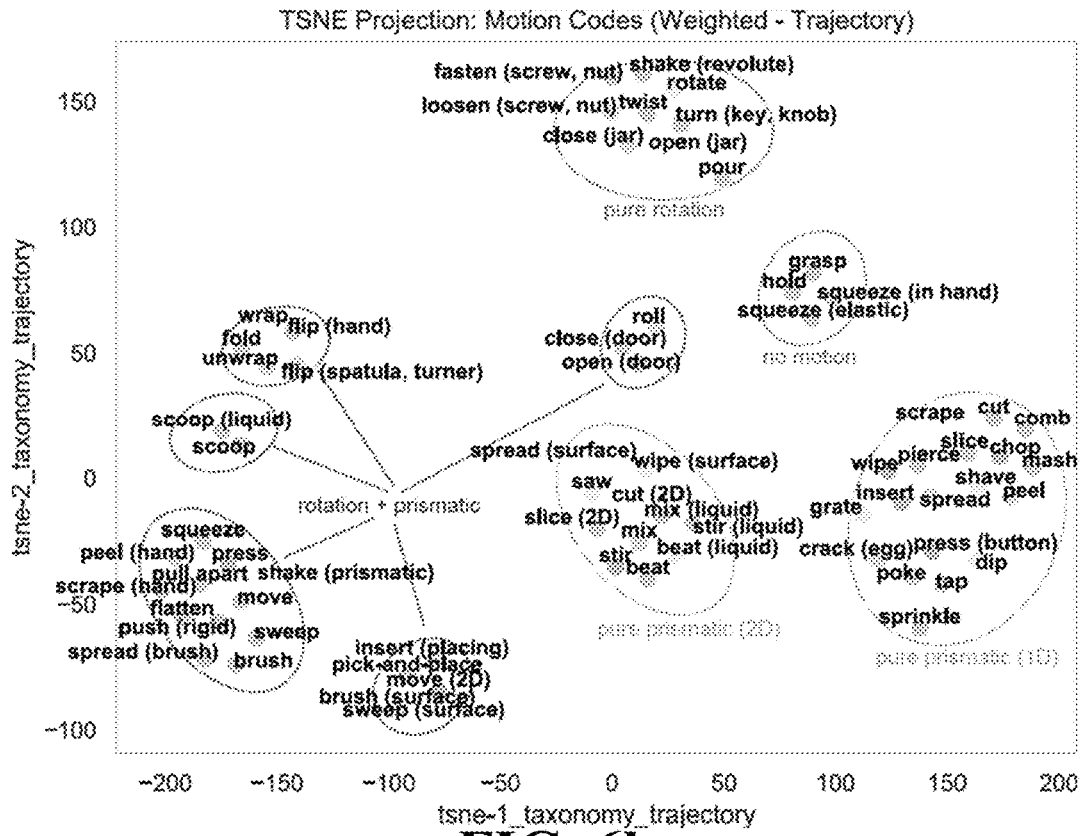
Figure 6C:
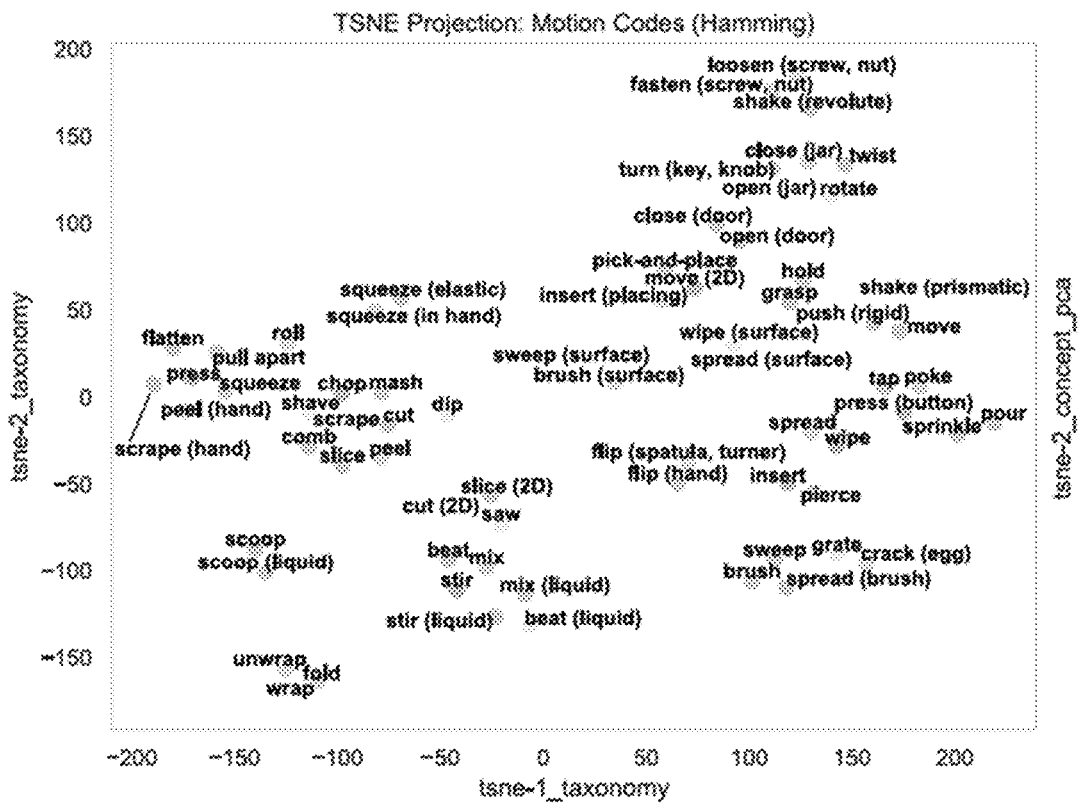
Figure 6D:
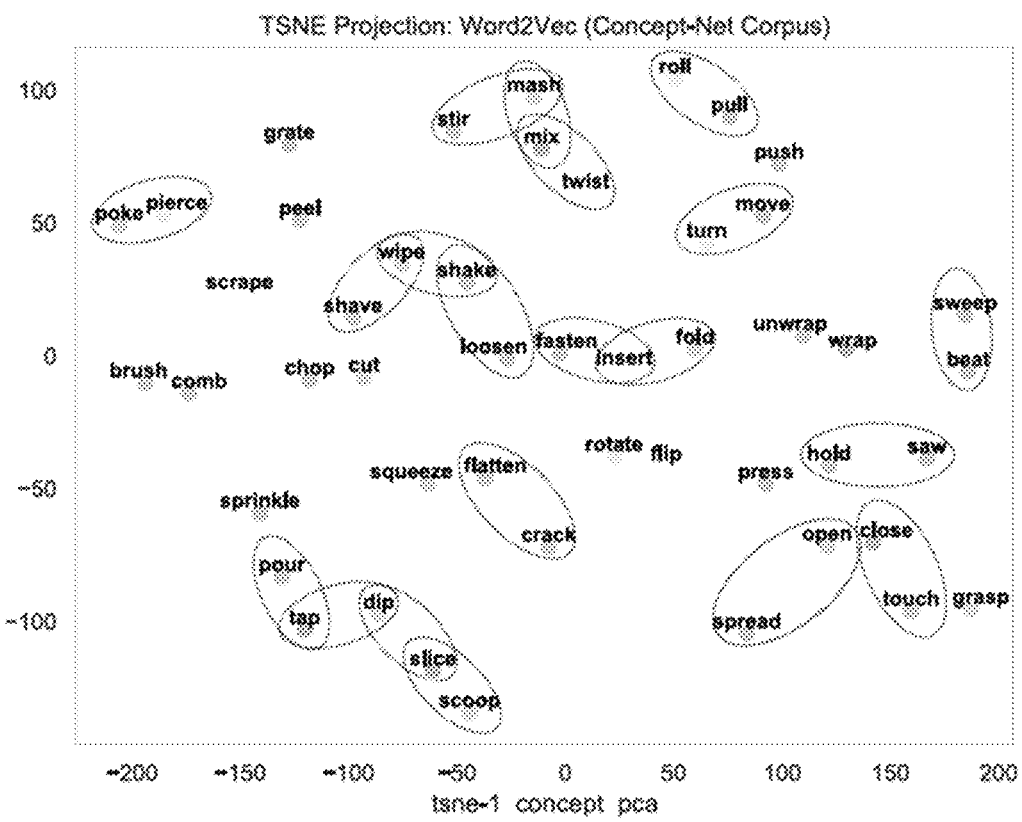
Figure 6E:
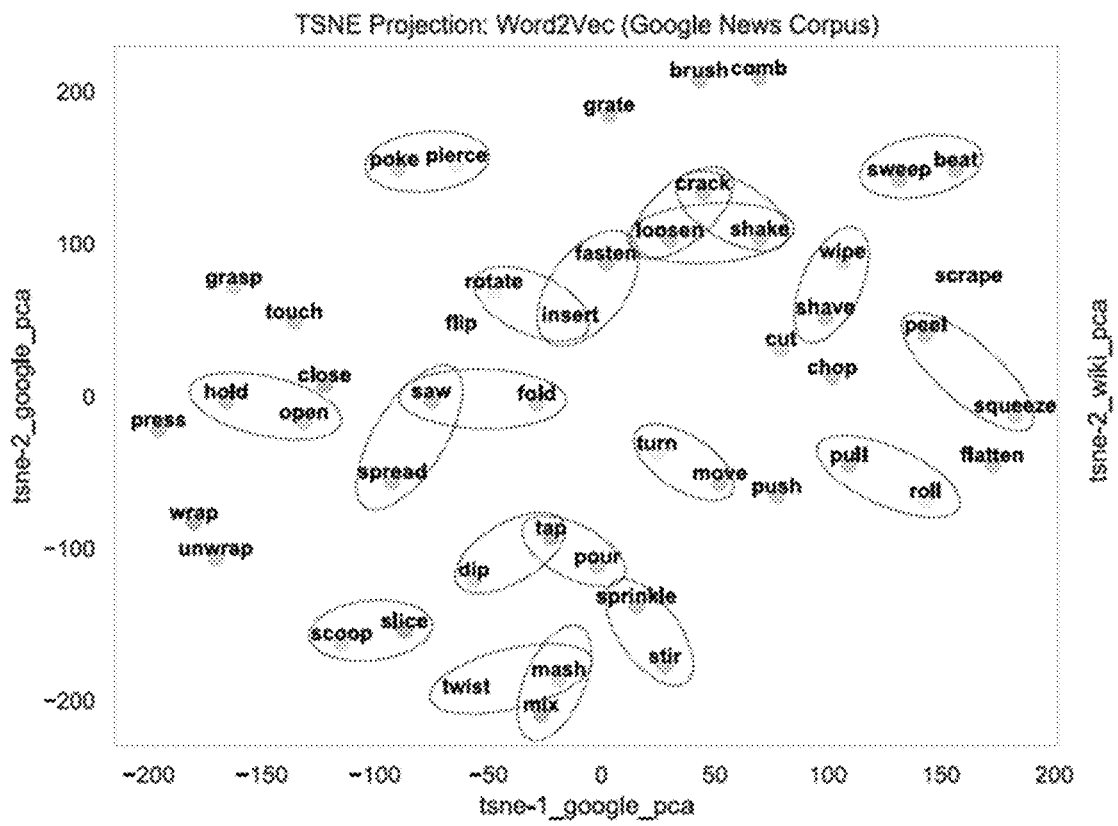
Figure 6F:
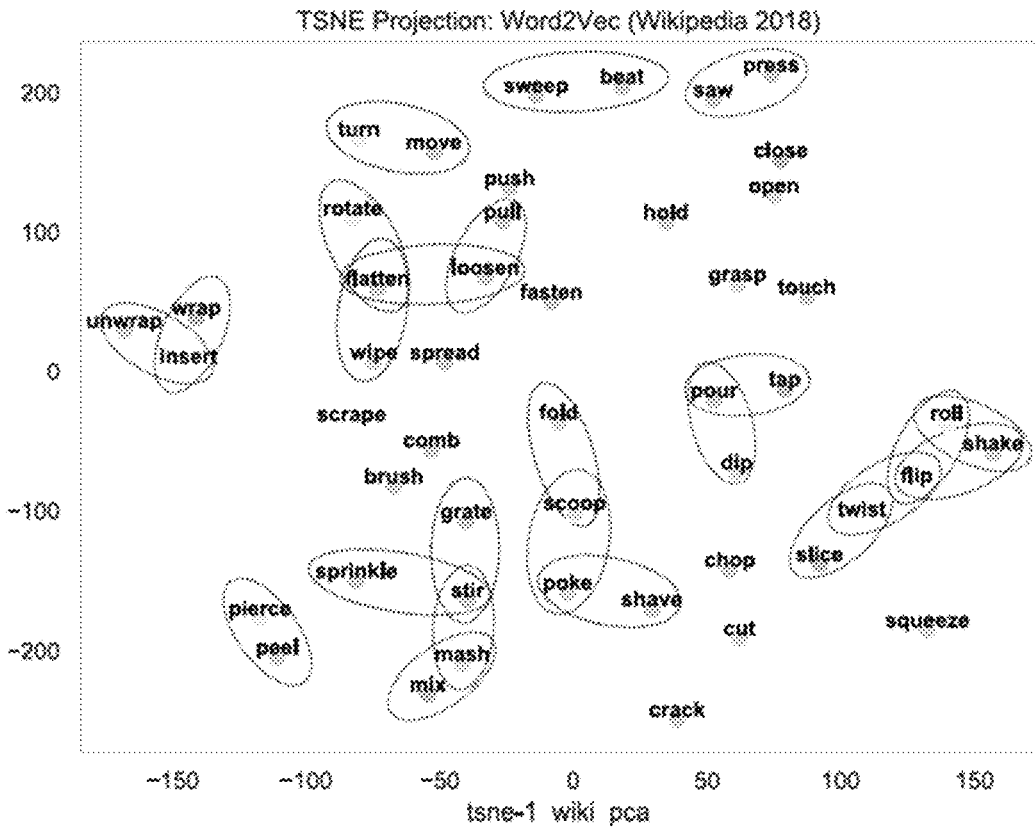

FIGS. 6a, 6b and 6c show 2-dimensional projections based on motion codes, while FIGS. 6d, 6e and 6f show the 2-dimensional projection of motions based on pre-trained Word2Vec models from Concept-Net, Google News and Wikipedia. Distances in t-SNE for Word2Vec vectors were measured using the cosine similarity metric; with motion codes, this example used the regular Hamming metric (FIG. 6c) and a weighted distance metric that this example defined. Using a weighted approach allows to emphasize dissimilarity based on key motion taxonomy attributes rather than the regular Hamming metric, which measures the degree of dissimilarity among bits with no considerations for their meanings.

Rather than simply setting the penalty of dissimilarity to 1, two weighted values, α and β, which are used to set the priority of contact or trajectory types when measuring distances were defined. α is a penalty applied when two motions are of different interaction type (i.e. contact versus non-contact), as well as contact duration and engagement type, which is reflected by the 1st to 7th most significant bits (MSB); β is a penalty applied for trajectory types, reflected by the 8th to 12th MSB (active trajectory) and 13th to 17th MSB (passive trajectory) of the motion code; specifically, if one motion code exhibits movement and another does not, β is added to their distance value, but if they simply differ by the number of axes (1, 2 or 3 DOF), then only half of β is added. All other attributes were measured normally with a penalty of 1. FIGS. 6a and 6b illustrate the difference between these distance variations for t-SNE. In FIG. 6a, a higher weight is assigned when two motion code vectors are different in interaction type (contact), while FIG. 6b places more emphasis on motion trajectory type. In these figures, naturally occurring clusters and neighboring motion codes that share common attributes are highlighted.

4. Discussion on Word2Vec Comparison

As seen in the t-SNE plots in FIG. 6, using motion codes (from Table I) for embedding will result in the placement of functionally similar motions close to one another (while distancing those that are functionally different as other clusters) in a different way to Word2Vec embedding. Using a weighted approach rather than the Hamming distance between motion codes preserves neighbors better. The major disadvantage of Word2Vec vectors is that we are unable to capture multiple senses or meanings for a single word label. Furthermore, there is no way of discerning between different forms of a word such as parts of speech. For instance, in FIGS. 6e and 6f, 'pour' is placed closest to the word 'tap', just as we introduced before. Since the word 'tap' in the English language can either be a verb or noun, the word was interpreted in the context of the noun, as water usually flows or pours out of the tap. The same can be said of the pair 'move' and 'turn', which perhaps emphasize the noun meaning more than their verbal meaning.

However, when considering the manipulation in a mechanical sense, it does not match our expectation since their functional attributes are different, where 'tap' is considered as contact and prismatic and 'pour' is non-contact and revolute. Instead, using motion codes, if we prioritize trajectory type (FIG. 6b), the label 'pour' is placed to other revolute only motions such as 'turn (key)', and 'fasten (screw, nut)' (although being a cyclical motion); if we prioritize contact interaction type (FIG. 6a), the label 'pour' was placed closest to the label 'sprinkle' since it is also non-contact while being placed further away from contact engagement motions. Other Word2Vec results that do not match functionality (which we highlight with red ellipses) include 'beat'/'sweep 'stir'/'sprinkle' (FIGS. 6e and 6f), 'dip'/'tap', and 'mash' and 'mix'. Other than the highlighted motion pairs, Word2Vec embedding generally captured the connection between certain labels such as 'cut'/'slice'/ 'chop' and 'sprinkle'/'pour' since these are synonymous to one another. Another shortcoming of Word2Vec embedding is that we are unable to compare functional variants of motion types, which was the reason behind simplifying labels to single words. However, this leads to ambiguity in motion labels since we cannot be very descriptive using one word. For example, the labels 'open door' and 'open jar' were simplified as 'open', but the sense of opening can differ depending on the manipulated object. With the two separations 'open door' and 'open jar', although they serve a similar purpose, the way the motion is executed is different, and these mechanics should be considered when evaluating differences between motions. Such pairs include 'shake' (prismatic and revolute), 'mix' (liquid and non-liquid) and 'brush' (surface and non-surface).

5. Conclusion on this Example

As seen in the t-SNE plots in FIG. 6, using motion codes (from Table I) for embedding will result in the placement of functionally similar motions close to one another (while distancing those that are functionally different as other clusters) in a different way to Word2Vec embedding. Using a weighted approach rather than the Hamming distance between motion codes preserves neighbors better. The major disadvantage of Word2Vec vectors is that we are unable to capture multiple senses or meanings for a single word label. Furthermore, there is no way of discerning between different forms of a word such as parts of speech. For instance, in FIGS. 6e and 6f, 'pour' is placed closest to the word 'tap', just as we introduced before. Since the word 'tap' in the English language can either be a verb or noun, the word was interpreted in the context of the noun, as water usually flows or pours out of the tap. The same can be said of the pair 'move' and 'turn', which perhaps emphasize the noun meaning more than their verbal meaning.

To conclude, in this example, this example proposed an embedding for manipulations better suited for motion recognition in robotics and AI using the motion taxonomy. Embedding with this taxonomy circumvents the issue of language where words can take on multiple meanings. One can represent motions using attributes defined in the taxonomy as binary bits, and vectors will describe the mechanics of motions from the robot's point of view. The experiments demonstrated that these motion codes, when compared to Word2Vec (which uses natural language for training), produce embedding that provide better metrics for classification. Furthermore, these features can be extracted directly from demonstration data; with a suitable model, motion codes can be automatically generated. Motion code features are not limited to those mentioned in this paper, as other attributes could be included that can be extracted directly from data and are more representative depending on the context.

B. An Example for Verb Classification Using Motion Code Embedding

Figure 7:
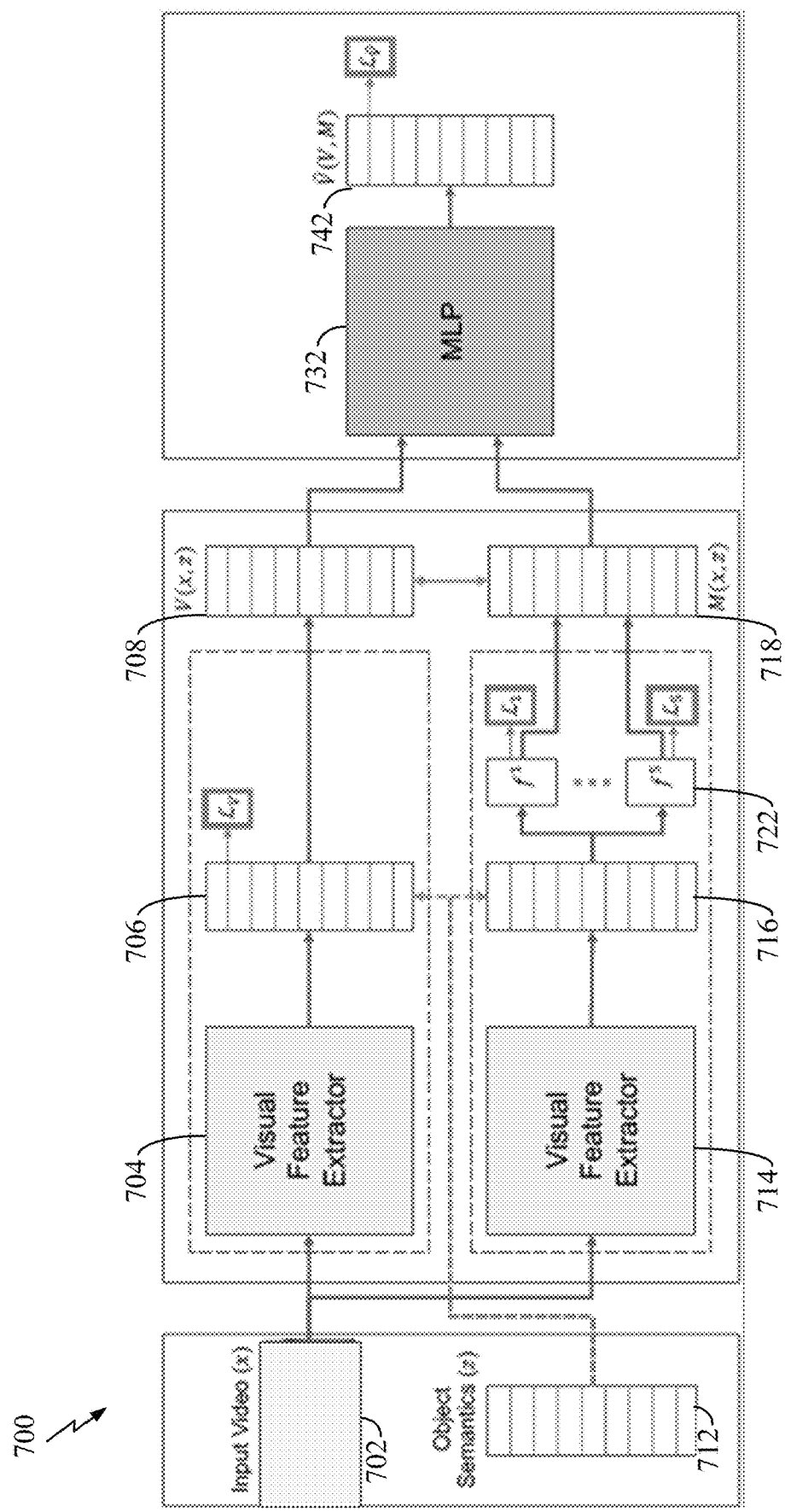
FIG. 7 illustrates an example of a structure of verb classification framework augmented by motion code predictor according to some embodiments.

This example proposes a model for verb classification that is described as follows. Let $x_i \in X$ be the $i^{th}$ video 702 in the set of videos and $y_i \in Y$ be the corresponding verb class label of that video. Some embodiments of classification models first extract the visual features 704 from the video into a latent space as $V: X \to \Omega$. The returned feature vector 708 can then be used as the probability distribution of verb classes, where the class with the highest probability value is picked. This exemplary method augments that model with a motion code embedding model, which takes the same input video $x_i$ 702 and similarly extracts its features 714 into another latent space as $\theta: X \to \Gamma$. The feature vector is then passed through five classifiers 722, $f^k: \Gamma \to \Lambda^k$, (where k ranges from 1 to 5), which are responsible for classification of individual motion components, as we have described in Section II.B. This example concatenates the output probability distributions of all motion components into a single vector 718, which represents a continuous motion embedding for the input video. Finally, the probability distribution vector 708 for verb classes and motion embedding vector 718 are combined into a single feature vector. That vector is then passed through a multi-layer perceptron (MLP) 732, denoted as $V: (\Omega, \Lambda) \to \Omega$, that outputs the final verb class probability distribution 742, from which the verb class $\hat{y}_i$ is inferred. The overall structure of the network 700 is shown in FIG. 7. All objective functions are cross-entropy losses. The motion code embedding model were trained separately before integrating it into action recognition model. The objective function of the motion code embedding model is defined as a linear combination of individual losses: $L_M = -\Sigma_{k=1}^{5} \Sigma_{l=1}^{C_k} \lambda_k m_l^k \log(f_l^k(x))$, where $\lambda_k$ is a constant weight and $m_l^k$ is an $l^{th}$ element of the ground truth on-hot vector for the kth motion code component. In the experiments, the value of all $\lambda_k$ is set to 1. However, these values can be tuned to emphasize motion components that are considered more important than others. For simplicity, we refer to the entire motion code embedding model as $M: X \to \Lambda$.

The impact of incorporating the semantic information about the objects-in-action may be considered. Verbs by themselves can be very ambiguous from a mechanical perspective because the same verb can be executed via different types of motions. For instance, one may associate the verb open with one motion when opening a door and with another motion when opening a bag. The verbs in these cases are almost semantically identical, but visually and mechanically they are quite different. This ambiguity can be reduced with the knowledge about the object that the person is interacting with. Hence, such extra information can potentially benefit the motion code embedding model, which may benefit the verb classification accuracy.

Let $z_i \in Z$ be a semantic feature of the object that is being manipulated in the video. This example modifies the model mentioned above by combining that information with the visual feature of the motion embedding model as shown in FIG. 7. For completeness, object semantics to the baseline verb classifier were integrated. Due to this modification, denote the models that integrate object semantic features as V (x, z) and M(x, z). Hence, our final model has 4 variations, namely $\hat{V}(V_x, M_x)$, $\hat{V}(V_{x,z}, M_x)$, $\hat{V}(V_x, M_{x,z})$, and $\hat{V}(V_{x,z}, M_{x,z})$. Note that if only one model utilizes that information, then the performance of the other model will not be affected. For instance, in model $\hat{V}(V_x, M_{x,z})$, the model $V_x$ is agnostic to the object information, while the performance of the motion embedding model gets the direct impact. Consequently, the performance of $\hat{V}(V_x, M_{x,z})$ is not directly affected by the object knowledge neither; instead, its performance changes based on the new performance of motion embedding.

1. Experiments—Dataset Annotation

The EPIC-KITCHENS dataset is used to test how motion code embedding may benefit verb classification models. This dataset contains egocentric cooking videos that are labeled with verbs and nouns. 3,528 videos out of 28,472 are annotated in the training set of EPIC-KITCHENS. Each video was annotated with a ground truth motion code by following the motion taxonomy in FIG. 2. The entire dataset was not annotated, as the manual labeling of videos with motion codes proved to be a very time-intensive task. The resulting dataset contains videos with 32 unique motion codes and 33 verb classes, which was split into 2,742 videos for the training set and 786 videos for the validation set. 1,517 testing videos labeled with 33 verb classes were sampled from the remainder of the EPIC-KITCHENS.

2. Experiments—Implementation Details

Two-Stream Inflated 3D ConvNet (I3D) was used to extract visual features for both motion code embedding and baseline verb classification models. The model was pre-trained on Kinetics dataset and uses InceptionV1 that was pre-trained on the ImageNet dataset as the base network. Both RGB and optical flow frames were used to tune the model. The outputs of two modalities were averaged with late-fusion. This model was chosen because it achieved the best results on the verb classification task in the latest EPICKITCHENS Action Recognition Challenge 2019. The extracted latent feature vector is then concatenated with 300-dimensional object semantic vectors. These semantic vectors were obtained from Word2Vec model that was pre-trained on Google News dataset with 3 million words. Videos in EPIC-KITCHENS are annotated with nouns that represent the object-in-action, which are fed into Word2Vec model.

The input videos were sampled to 6 frames per second. During training, 12 consecutive frames were sampled from a random starting frame and sampled frames were randomly cropped and horizontally flipped. During validation and testing, all frames were used and center cropped. This strategy was adapted from NTU-CML-MiRA team's implementation for the EPIC-KITCHENS Action Recognition Challenge 2019.

Both motion code embedding and baseline verb classifier were trained for 50 epochs with an initial learning rate of 0.0003 that reduced by 40% every 5 epochs. The weights of the convolutional layers were frozen for the first 3 epochs to allow the top layers to fine-tune and to be properly initialized.

For the joint verb classification, $\hat{V}(V,M)$, the outputs of both the motion code embedding and baseline verb classifier were concatenated into a single input vector. The vector is then passed through an MLP with 2 fully connected layers. They were trained separately for 200 epochs with a learning rate of 0.0005. All models were trained with Adam optimizer.

3. Results—Quantitative Results

Before training the verb classifier, the motion code embedding model is trained and evaluated. Table II shows the top-1accuracy of predicting the motion codes from the video ($M_x$), as well as with the knowledge about the nouns ($M_{x,z}$). With the object semantic data, the model achieves much higher accuracy. The model learns the correlation between certain objects and the motions that are usually executed on them. Given the fact that there are 180 valid motion codes and less than 3,000 training videos, the accuracy of almost 40% is an acceptable result.

TABLE III motion code embedding accuracy results on validation videos (as %)

| Models | RGB | Flow | Fused |
|---|---|---|---|
| Baseline, $M_x$ | 35.1 | 35.2 | 38.9 |
| Nouns, $M_{x,z}$ | 45.3 | 46.1 | 48.0 |

With the pre-trained motion embedding model, the proposed model is compared with two variations of baseline I3D model, namely V(x) and V(x; z). Each baseline is compared to the models that augment it with two variations of the motion code embedding model, namely M(x) and M(x, z). Top-1 verb classification accuracy is used as the evaluation metric for our experiments.

Table IV outlines the results on the test set. As one can observe from the first 2 rows, the application of motion embedding features slightly improves the accuracy over the baseline. However, when the motion embedding model was augmented with nouns, which previously resulted in more accurate motion code prediction, the impact of our model becomes more significant. A similar trend is observed with the second baseline model $V_{x,z}$. The model showed a significant boost over $V_x$ due to the nouns. Nevertheless, if the vanilla motion embedding model features $M_x$ is applied, getting higher accuracy is possible, while more accurate motion features from $M_{x,z}$ result in even more boost in performance.

Figure 8:
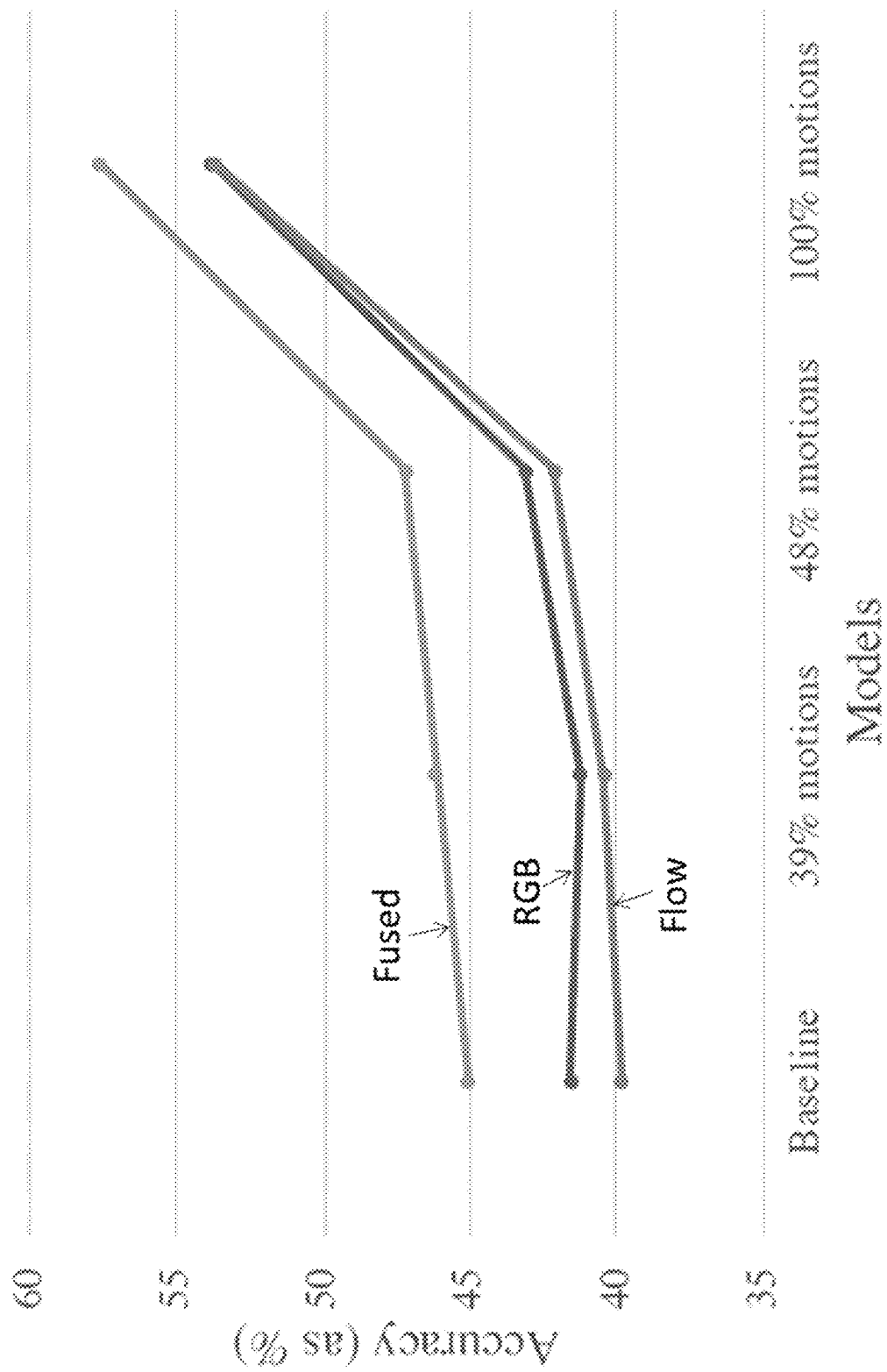
FIG. 8 illustrates Top-1 verb classification accuracy on validation set based on accuracy on motion embedding features.

The results from Table IV demonstrate that motion embedding features benefit the verb classifier, but the improvements had insignificant margins. This is due to the relatively low motion embedding accuracy, which was caused by a small training set. Therefore, this exemplary model is evaluated on the validation set, which has ground truth motion codes, allowing us to use them as the motion features directly. Table IV shows the top-1 verb classification accuracy results on the validation set. As previously, model with motion features from vanilla motion embedding model $\hat{V}(V_x, M_x)$ is slightly better than the baseline, while $\hat{V}(V_x, M_{x,z})$ makes improvements more significant. However, if we have ground-truth motion codes (i.e., 100% accurate), its accuracy becomes even higher than $V_{x,z}$, which uses ground truth nouns. In other words, the features from the motion codes are more visually valuable to the verb classifier than the knowledge about the object-in-action. FIG. 8 illustrates the trend of the verb classification accuracy based on the accuracy of motion features.

TABLE IV

Verb classification comparison on testing videos based on Top-1 accuracy (as %)

| Models | RGB | Flow | Fused |
|---|---|---|---|
| Baseline, $V_x$ | 33.36 | 31.62 | 36.12 |
| Motions, $\hat{V}(V_x, M_x)$ | 33.62 | 32.30 | 36.78 |
| Motions with nouns, $\hat{V}(V_x, M_{x,z})$ | 34.08 | 34.74 | 38.04 |
| Baseline with nouns, $V_{x,z}$ | 38.69 | 38.76 | 41.73 |
| Motions, $\hat{V}(V_{x,z}, M_x)$ | 38.89 | 37.05 | 42.06 |
| Motions with nouns, $\hat{V}(V_{x,z}, M_{x,z})$ | 38.83 | 39.95 | 42.12 |

TABLE V

Verb classification comparison on validation videos based on Top-1 accuracy (as %)

| Models | RGB | Flow | Fused |
|---|---|---|---|
| Baseline, $V_x$ | 41.60 | 39.82 | 45.04 |
| Baseline with nouns, $V_{x,z}$ | 48.22 | 44.15 | 49.24 |
| Predicted Motions, $\hat{V}(V_x, M_x)$ | 41.22 | 40.46 | 46.18 |
| Predicted Motions with nouns, $\hat{V}(V_x, M_{x,z})$ | 43.13 | 42.11 | 47.20 |
| Gound Truth Motions, $\hat{V}(V_x, \overline{M}_x)$ (Using true motion code as embedding) | 53.82 | 53.69 | 57.63 |

Tables IV and V shows that, in most cases, models that use optical flow frames benefit more from using motion codes than their RGB counterparts. In Table IV, the first baseline $V_x$ classifies verbs more accurately when it uses RGB frames as opposed to using optical flow frames. After applying motions predicted by $M_x$, the optical flow model improved more than the RGB model, although still giving lower overall accuracy. However, after applying an improved motion code embedding $M_{x,z}$, the performance of the flow model was better than the RGB model. In the baseline model with nouns $V_{x,z}$, RGB and flow models have very close performances, but model $\hat{V}(V_{x,z}, M_{x,z})$ performs noticeably better with flow frames. Table III also supports that motions predicted from flow frames are consistently more accurate than from RGB frames. On validation set, both baseline verb classifiers, $V_x$ and $V_{x,z}$, perform significantly better on RGB modality, but that distance gets reduced with motion embedding features and approaches its minimum when using ground truth motion codes as shown in Table V.

To summarize, as we elaborated in Section II.B, the importance of motion feature estimation is emphasized for action recognition, such as more accurate optical flow computation. The observations corroborate this viewpoint as this example demonstrated a high correlation between our motion codes and optical flow vectors. In addition, the motion codes demonstrate that they provide more visually informative data in comparison with nouns. In real scenarios, the model will have access to neither ground truth nouns nor motion codes. However, these observations show that if motion embedding accuracy (e.g. by increasing the training dataset size) is improved, more significant improvements are improved in verb classification. Therefore, the motion code embedding model has the potential to be a significant add-on feature extractor for action recognition, especially in providing explainable motion features.

4. Results—Qualitative Results

Figure 9:
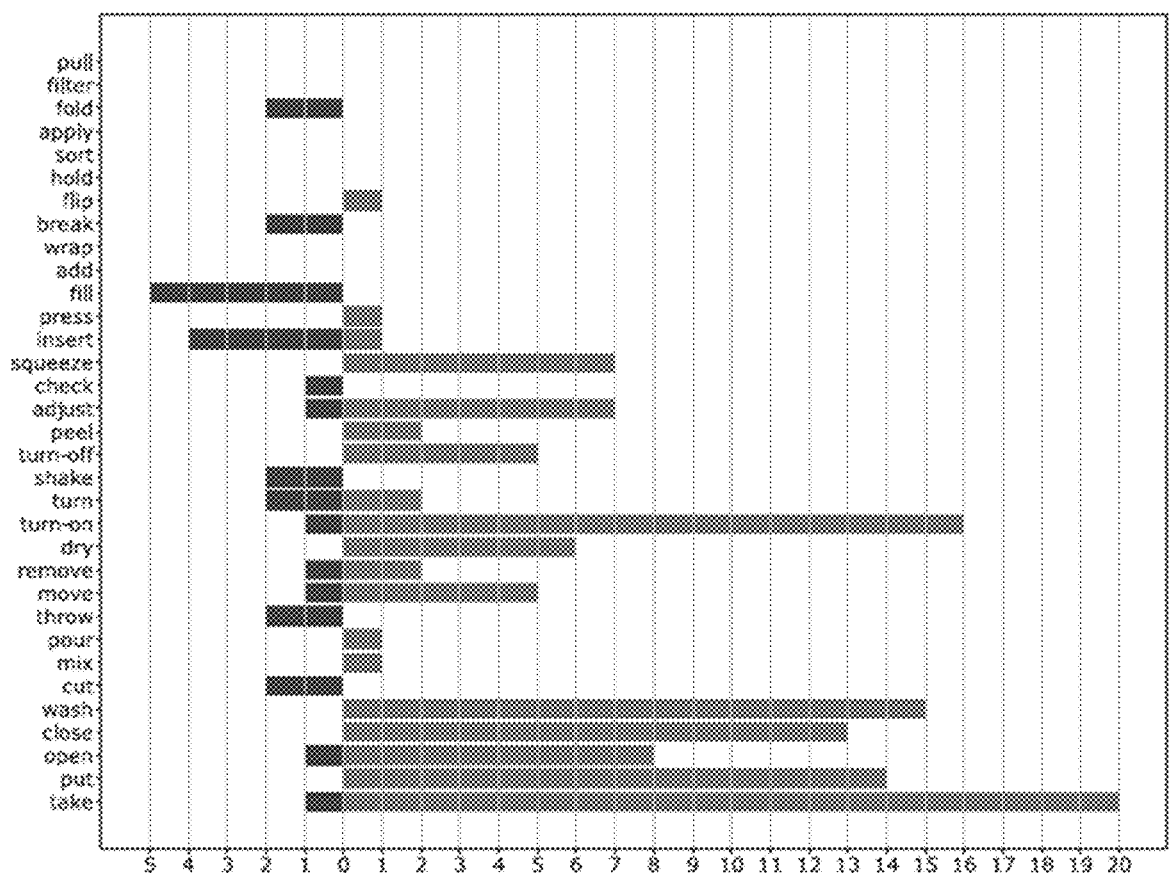
FIG. 9 illustrates a graph that shows number of videos that were correctly classified by a ground truth motions model but incorrectly classified by a baseline model and vice versa.

FIG. 9 shows the number of videos that were incorrectly classified by the baseline model (left side bars from zero) and were corrected by our model that uses ground-truth motion codes (right side bars from zero) or vice versa. It also shows videos that were misclassified by our model but were correct on the baseline. Most of the classes benefit from using ground truth motion codes, although with some exceptions. Five videos of class "fill" were predicted correctly with the baseline model and were misclassified by our model. Instead, they were classified as "put" (2 instances) or "take" (3 instances). By watching those videos, motions executed on them were indeed closer to put or take. All of them illustrate a person holding a kettle, water filter, or pan under the tap while the tap is filling those containers with water. Meanwhile, the most salient motion in all videos was the actor bringing and placing the container under the tap.

Another class that suffered from our model is "insert" with four misclassified videos. What is interesting about those videos is that three out of four of them were narrated as "put-in" action, while the class key is called "insert". Our model classified these videos as "put" class, and the videos themselves demonstrate how the actor puts the passive object on something. Therefore, this misclassification is caused by grouping verbs into coarse-grained classes, since in 3 out of 4 misclassified videos, the actual verbs that were narrated by the annotators match the class that our model predicted.

In short, the results shown in FIG. 9 and the analysis of videos that were misclassified by our model confirm that motion codes provide additional robustness to action recognition from the motion mechanics perspective. Had more fine-grained labels been used, the predicted labels would more adequately describe the action taking place.

5. Conclusion

This example has defined motion code embedding using motion taxonomy and trained a model that can project videos to the motion embedding space. This example also showed how such a kind of model could be used along with a state-of-the-art verb classification model and improve its performance.

C. An Example Using Motion Prediction Model

Figure 10:
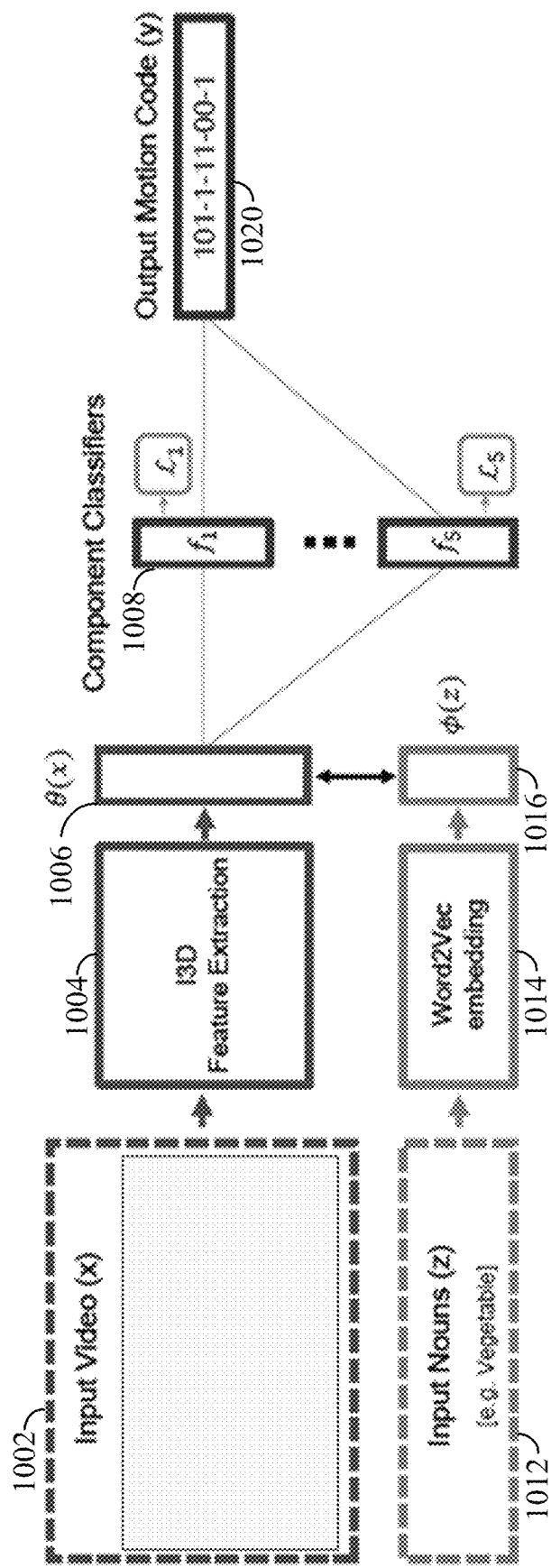
FIG. 10 illustrates an example of the combined network architecture used for motion code prediction according to some embodiments.

Having established the definition of the motion taxonomy and all properties it encompasses, we now discuss how we can automatically obtain motion codes from video demonstrations. In short, we design a deep neural network model to extract visual feature vectors from the videos, which are then further passed to classifiers for each component of the taxonomy. The overall structure is illustrated as FIG. 10.

1. Motion Prediction Model

Given a video x 1002 (where x ∈ X), a motion code y 1020 can be obtained. The motion code 1020 describes the manipulation taking place by feeding x 1002 into a deep network 1006 θ:X→Ω. Since the goal is to use video modality for motion code prediction, the deep network model θ 1006 should integrate spatial and temporal features of the videos. Presently, there are several action recognition models that satisfy these criteria. Our choice fell on Two-Stream Inflated 3D ConvNets (I3D). This architecture uses Inception-V1 convolutional neural network (CNN), which was pre-trained on ImageNet dataset, and inflates the 2D convolutional and pooling layers with a temporal dimension that were later tuned with the Kinetics dataset. The model also combines two modalities of video frames: RGB and optical flow frames. Two separate models for both modalities are trained individually, and the final feature vectors are obtained via late fusion by averaging two outputs. This model boasts the highest action recognition accuracy results on well-known benchmarks, including EPIC-KITCHENS in the experiments. To potentially improve motion code prediction, knowledge 1012 of the objects in action was incorporated into the training process. Formally, we modified the model described above by encoding the semantic features of the objects z ∈ X with embedding function ϕ: Z→Ψ and combining it with the visual features. For the experiments, these two feature vectors 1006, 1016 are concatenated. We use a Word2Vec model 1014 pre-trained on Google News (containing over 3 million words) to encode these semantic features about objects seen in each video. A model of this kind could be used for queries, where what kind of motion with a given object can be executed to replicate a certain activity.

From each video, we use the extracted features ω from I3D (where ω ∈ Ω) and the word embedding of object semantics (where ψ ∈ Ψ) as a feature vector ξ ∈ Ω, Ψ* (where Ψ* denotes that semantic features may or may not be used) to be passed into several classifiers $f_i$ 1008. To explain, each motion code was broken down into the five independent components: interaction type, recurrence, active prismatic motion, active revolute motion, and passive object motion with respect to active object. Each of these components were used to train individual classifiers whose output will be combined into a single code as opposed to predicting an entire motion code. In this way, individual predictors will more accurately identify features. In other words, the feature vector is then passed through these classifiers 1008 ($f_i$:(Ω, Ψ*)→$Y_i$ to then predict the value for the $i^{th}$ component, $y_i$ ∈ $Y_i$, of the final motion code. Each component was converted into one-hot vectors, making the motion prediction identical to feature classification. All components were then combined into a single motion code y 1020. The objective function for classification of the $i^{th}$ component, $L_i$, is a cross-entropy loss. The total objective function is the linear combination of all components' objective functions, as follows: $L=\Sigma_{i=1}^{5} \lambda_i L_i$.

2. Evaluation—Dataset and Training Details

Based on the proposed methodology, the performance of unsupervised motion code prediction from video demonstrations using this proposed model can be evaluated. Using videos from EPIC-KITCHENS, three variations of our motion prediction model were evaluated, and this shows how well they performed in deriving motion codes.

For the motion prediction model, this example uses videos from the EPIC-KITCHENS dataset for training. This example annotated 3,528 video segments with motion codes using the taxonomy (FIG. 2). Videos in EPIC-KITCHENS are annotated with object in action details in the "noun" field, where the entry is a list of words that describes the objects. This example used these words as an input z to the Word2Vec model. Overall, 2,742 videos were used for training and 786 were used for testing. The dataset was annotated with 32 unique motion codes, and each code had at least 20 video segments assigned as its label.

The entire model was trained for 50 epochs with Adam optimizer and the learning rate set to 0.0003 that decreases by 40% every 5 epochs. For the first 3 epochs, the convolutional layers of the base model were frozen to allow the top layers to fine-tune for a better initialization. The input video frames are sampled to 6 frames per second to increase the training and inference speed. As mentioned before, both RGB and optical flow frames were used. In this example, all λ coefficients are set to 1. During training, we add the $L_2$ norm of the network parameters multiplied by a weight decay factor to the loss function for $L_2$ regularization. The model was implemented with the TensorFlow library.

3. Evaluation—Results and Analysis

The example computed the results for three variations of our model: one that uses only visual features, another that incorporates noun vectors with visual features, and another that also uses noun vectors but with noise, where 20% of nouns are incorrect. Each model is also evaluated for the performance of each individual component of the motion codes, namely the interaction (3 bits), recurrence (1 bit), active prismatic motion (2 bits), active revolute motion (2 bits), and passive object motion with respect to the active object (1 bit). The models were evaluated based on their motion code prediction accuracy. Table VI shows that the baseline model performed fairly well given that there are not many training videos and 180 possible outcomes. However, when the accuracy measurement was relaxed to allow at most one bit to be incorrectly predicted, the overall performance increased by 32%, which means roughly a third of all predicted codes are just one bit off from the ground truth motion code. Another interesting thing to note is that in all cases, late fusion of the predictions of both modalities improves the overall performance of the model.

TABLE VI

Motion prediction accuracy results on test videos (as %)

| Models | RGB | Flow | Fused |
|---|---|---|---|
| Baseline | | | |
| Entire code | 35.1 | 35.2 | 38.9 |
| Entire code with 1 bit off | 67.3 | 64.5 | 70.9 |
| Interaction | 85.8 | 84.7 | 87.0 |
| Recurrence | 90.7 | 91.0 | 92.5 |
| Prismatic trajectory | 70.6 | 72.8 | 73.2 |
| Revolute trajectory | 74.4 | 76.2 | 78.5 |
| Passive motion | 68.6 | 64.8 | 71.9 |
| Nouns | | | |
| Entire code | 45.3 | 46.1 | 48.0 |
| Entire code with 1 bit off | 73.2 | 72.1 | 75.3 |
| Interaction | 86.4 | 86.4 | 87.9 |
| Recurrence | 90.6 | 91.2 | 92.1 |
| Prismatic trajectory | 76.0 | 74.4 | 74.9 |
| Revolute trajectory | 80.5 | 78.6 | 81.3 |
| Passive motion | 76.0 | 78.9 | 79.9 |
| Nouns (20% noise) | | | |
| Entire code | 40.8 | 39.9 | 43.1 |
| Entire code with 1 bit off | 70.7 | 68.8 | 72.1 |
| Interaction | 86.5 | 85.9 | 88.0 |
| Recurrence | 90.7 | 91.5 | 92.5 |
| Prismatic trajectory | 74.2 | 71.8 | 73.5 |
| Revolute trajectory | 76.3 | 76.6 | 78.4 |
| Passive motion | 72.4 | 72.6 | 73.9 |

Results in Table VI also suggest that using noun vectors as an input to the model improves the overall accuracy by 10%, which is quite a significant jump. If we look at the breakdown of individual components, noun vectors mostly benefit the prediction of passive object motion with respect to the active object. Roughly 10% of videos that were assigned incorrect motion codes by the baseline model but were then given correct codes from the noun model had only 1 bit that was wrong, which was the passive object motion bit. For instance, the baseline model classified a video as passive object motion being present with respect to the manipulator, while the ground truth is the opposite.

Interestingly, 8% of these videos showed an action where person either picks up and places an object or opens and closes it (e.g. door, microwave, fridge). The passive object motion bit for pick-and-place actions were corrected from 1 to 0, while in open and close actions, the bit was set from 0 to 1. In almost all cases when a person picks or places an object, the object is moving with the same trajectory as the hand, making the passive object stationary with respect to the hand. On the other side, when person opens or closes a door, the door always moves strictly around its axis, making it to have only a revolute motion with 1 DOF. Such kind of a motion trajectory is rarely performed by a human. These examples show that the model leverages the information about the objects and can make assumptions based on that knowledge. Even after adding 20% noise to the input noun vectors, the overall accuracy of motion code prediction lies right in the middle between the baseline model and the model with 100% correct noun vectors.

Overall, this model shows that it can successfully predict motion components. The performance can be further improved with a larger training set due to the large number of parameters to train in the I3D model. The EPIC-KITCHENS dataset includes 28,472 training videos, which is ten times larger than the size of our training set, but labelling these videos with ground truth motion codes is time-intensive. To predict the motion codes of the original length and format that would define the motions in a more detailed way could be achieved with ADL videos of the same scenes from multiple perspectives. In addition, readings from motion sensors could be helpful in predicting motion trajectories of all objects with respect to a fixed point in the world coordinate system.

4. Conclusion

This example builds upon verb embedding as motion codes proposed for a robot's understanding of motions in a physical space. Motion codes are created using the motion taxonomy to describe motions from a mechanical perspective. Prior to this disclosure, motion codes were not obtained automatically from demonstration videos; therefore, this example introduced an approach for extracting motion codes directly from video demonstrations referring to as motion code prediction. Using existing neural network models, a deep model that identifies components from the taxonomy separately, which are then concatenated to form a single motion code was designed.

This example showed an accuracy of 70.9% when we allowed at most 1 bit to be incorrect from the ground truth using the baseline model that only considers visual features; however, by integrating nouns associated with each video with the model, this performance was improved to 75.3%. Even when considering an overall correct prediction, noun integration significantly improved results by 10%. The achieved results lead to believe that embedding motions with our taxonomy may also contribute to action recognition from videos. Such an approach to embedding introduces a new motion space that can bridge the gap between visual features and the action labels and other semantic features. In addition, the generated motion codes could be used as an attribute space for zero shot learning.

General Systems and Methods

Figure 11:
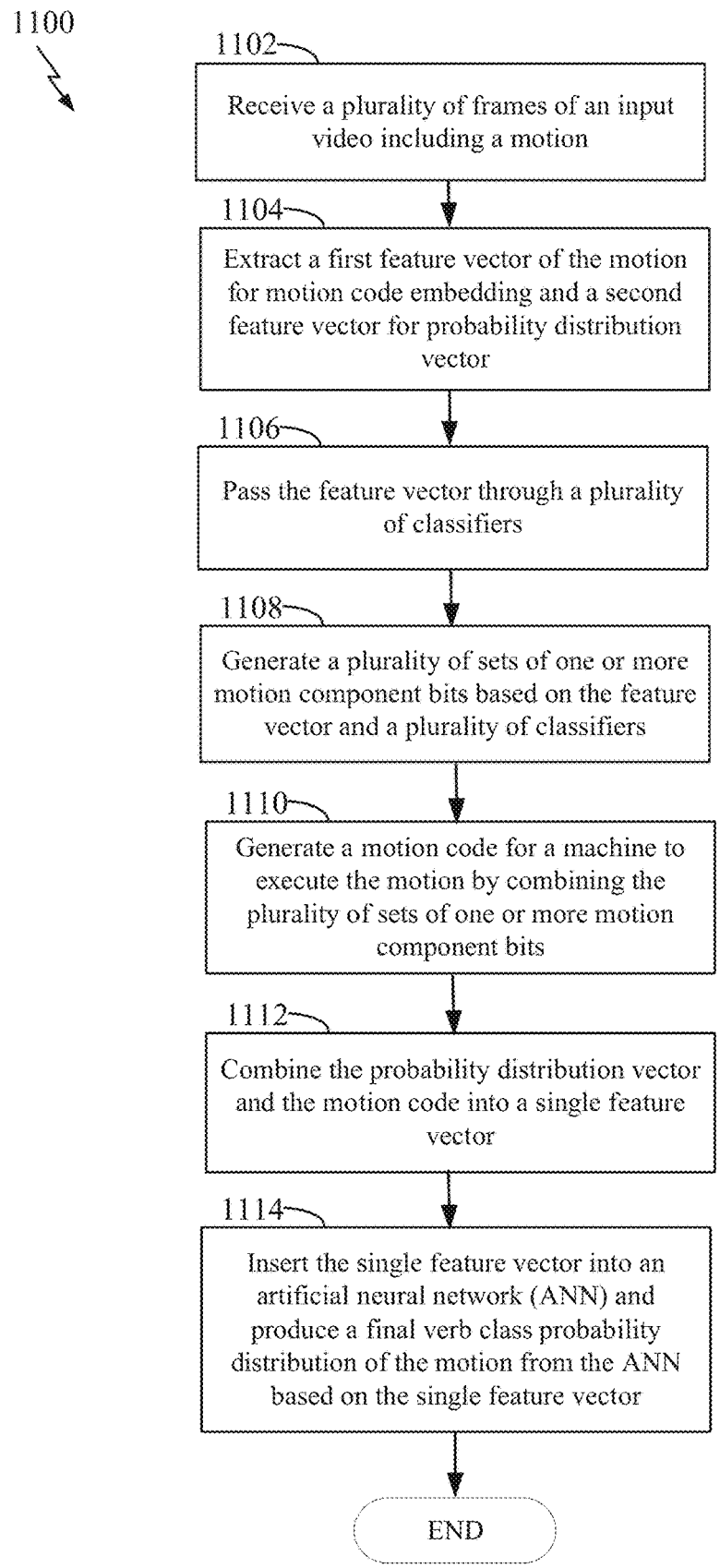
FIG. 11 is a flow chart illustrating an exemplary process for motion taxonomy for manipulation embedding according to some aspects of the disclosure.

Having described above several examples and embodiments, the present disclosure will now describe general systems and methods for achieving certain advantages over the prior art. FIG. 11 is a flow chart illustrating an exemplary process for motion taxonomy for manipulation embedding in accordance with some aspects of the present disclosure. As described below, a particular implementation may omit some or all illustrated features and may not require some illustrated features to implement all embodiments. In some examples, any suitable apparatus or means for carrying out the functions or algorithm described below may carry out the process 1100.

In block 1102, a system may receive a plurality of frames of an input video. These frames may be received from a sensor, such as an optical, infrared, or depth camera that is a part fo the system, or may be received via a communications network from a remote source. The input video may include a motion (e.g., chopping).

In block 1104, the system may extract a feature vector of a motion in the plurality of frames. The apparatus may use one program (e.g., I3D) to extract the feature vector. The feature extraction may use a neural network (CNN), which is trained on a dataset, and inflates the 2D convolutional and pooling layers with a temporal dimension that are later tuned with a Kinetics dataset. Here, the apparatus may take the plurality of frames of the input video and extract its features into a latent space. The returned featured vector can be used as the probability distribution of verb classes, where the class with the highest probability value is picked.

Also, the apparatus may uses the feature extraction for motion code embedding. Here, the apparatus may take the plurality of frames of the input video and extract its features into another latent space.

At block 1106, the apparatus may pass the feature vector through a plurality of classifiers which are responsible for classification of individual motion components. In some examples, the plurality of classifiers may include an interaction type, an active trajectory type, and a passive trajectory type. The interaction type may indicate whether the motion is a contact motion. The contact motion comprises an engagement type and a contact duration type. The engagement type may indicate whether the contact motion causes deformation on an object. In some examples, the contact duration type indicates whether the contact motion persists for a predetermined period of time. In other example, in determining contact type and duration, visual features such as bounding boxes drawn over objects in-action derived from object detection models can calculate the duration of intersection between active and passive object boundaries. In a further example, the active trajectory type may include a prismatic type, a revolute type, and a recurrence type. The prismatic type may indicate whether the motion is along a single axis, a plane, or a manifold space. The revolute type may indicate whether the motion is rotational. The recurrence type may indicate whether the motion is cyclical. The passive trajectory type may indicate whether the motion is with a passive object. In some examples, the plurality of classifiers may be five classifiers: an interaction type, a prismatic type, a revolute type, and a recurrence type, and a passive trajectory type. In some examples, the apparatus may incorporate a semantic feature of an object into the motion into the feature vector and the plurality of classifiers.

At block 1108, the system may generate a plurality of sets of one or more motion component bits based on the feature vector and a plurality of classifiers. The plurality of sets may correspond to the plurality of classifiers. Each set of one or more motion component bits may represent a physical or mechanical attribute of the motion.

For example, if a person chops a cucumber with a knife, the active object-in-action is the hand/knife combination, while the passive object-in-action is the cucumber. The idea is to identify the characteristics of the five classifiers. Since the knife engages in contact with the cucumber to chop it into smaller units, this motion would be classified as a contact manipulation of soft engagement type ('11'). This contact may be considered as continuous contact since the knife must contact and touch the cucumber ('1').

Next, the trajectory of the motion can be described. First, with the active object, the knife is usually translated in a single direction in order to make slices or to divide the cucumber into portions. In cutting, there is typically no observable rotation, as slices are made evenly throughout the action. Therefore, the codes will have the bits '01-00' for prismatic and revolute trajectory respectively. If a demonstration where the knife is repeatedly chopping is observed, then there is recurrence ('1-01-00'); if not, then there is no recurrence ('0-01-00'). In terms of passive object motion, since the knife is moving while the cucumber is stationary, the cucumber is moving with respect to the active object, and so this motion is indicated with '1'. In all, a 9-bit motion code such as '111-0-01-00-1' describes a chopping demonstration.

At block 1110, the apparatus may generate a motion code for a machine to execute the motion by combining the plurality of sets of one or more motion component bits. The motion code may be generated by combining the plurality of sets of one or more motion component bits in an ordered sequence. The motion code may include a binary encoded string for a machine to execute the motion.

At block 1112, the apparatus may combine the probability distribution vector and the motion code into a single feature vector. The motion code may be a vector to be combined with the probability distribution vector.

At block 1114, the apparatus may insert the single feature vector into an artificial neural network (ANN) and produce a final verb class probability distribution of the motion from the ANN based on the single feature vector. That is, the single feature vector is passed through a multi-layer perceptron (MLP) that outputs the final verb class probability distribution. The motion code embedding model may be pre-trained separately before integrating it into action recognition model. The objective function of the motion code embedding model is defined as a linear combination of individual losses: $L_M = -\Sigma_{k=1}^{5}\Sigma_{l=1}^{C_k} \lambda_k m_l^k \log(f_l^k(x))$, where $\lambda_k$ is a constant weight and $m_l^k$ is an lth element of a ground truth on-hot vector for a kth set of the one or more motion component bits.

The verb class probability distribution can then be utilized in a number of ways. In some embodiments, the distribution (or the most likely verb) can be displayed to a user. In other embodiments, the distribution (or the most likely verb) can be provided to a device to be used as the basis for planning or analyzing a real world action. The real world action could be an emulation of the detected motion described by the motion code, or a complementary or consequential action that results from the motion code.

For example, a code could be supplied to a robotic armature or other robotic system to inform the system to emulate/perform the movement in a real world scene. In such an example, optical or other sensors of the robot may assess a scene (a kitchen, a surgical room, a mine, a construction site, or an environment not suitable for human presence) and determine the objects present. Based on the environment and objects present, a processor of the robot may confirm that the top/most likely verb is the appropriate action to take in the given scene. E.g., if a vegetable is present on a table, the robot may confirm that "cutting" is the action to take with respect to the vegetable. Accordingly, the robot may utilize spatial information of its scene to plot a "cutting" action, based upon the robot's understanding of the action supplied by the verb.

In other examples, a consequential action may be taken as a result of the motion code. In some embodiments, a consequential action might be an alarm or other emergency action if a camera determines that certain actions are taking place. For example if a wire is cut during a construction operation (the motion code was "cutting" and the object to which the cutting was applied is a wire or other object that should not be cut), or a security camera detects certain activities within a given setting (e.g., drug use, use of weapons, or theft), authorities can be alerted. Alternatively, the consequential action might be complementary to the motion code. For example, if a motion code is provided to a machine indicating that an object was set down on a given surface, the complementary action might be to pick up the object and move it to a different surface. Or, if the motion code represents an individual pointing at an object, the complementary action might be to bring the object to the person.

Hardware Configuration Example

Figure 12:
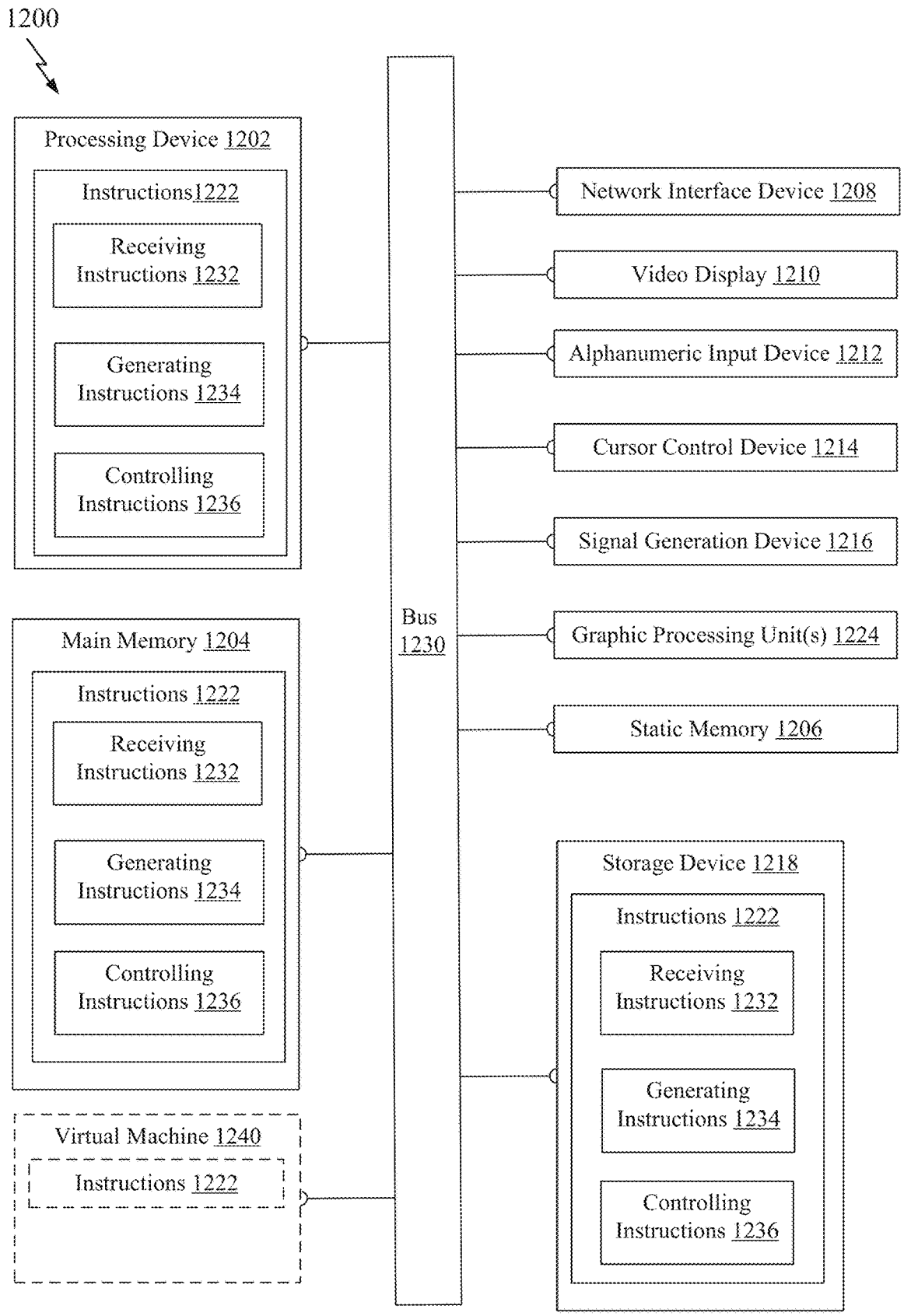
FIG. 12 is a block diagram conceptually illustrating an example of a hardware implementation for the methods disclosed herein.

FIG. 12 is a block diagram conceptually illustrating an example machine of a computer system 1200 within which a set of instructions, for causing the machine to perform any one or more of the methods disclosed herein, may be executed. In alternative implementations, the machine may be connected (such as networked) to other machines in a LAN, an intranet, an extranet, and/or the Internet.

The machine may operate in the capacity of a server or a client machine in a client-server network environment, as a peer machine in a peer-to-peer (or distributed) network environment, or as a server or a client machine in a cloud computing infrastructure or environment. The machine may be a server computer, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methods discussed herein.

The example computer system 1200 includes a processing device 1202, a main memory 1204 (such as read-only memory (ROM), flash memory, dynamic random access memory (DRAM) such as synchronous DRAM (SDRAM) or DRAM, etc.), a static memory 1206 (such as flash memory, static random access memory (SRAM), etc.), and a data storage device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 2302 is configured to execute instructions 1222 for performing the operations and steps discussed herein.

The computer system 1200 may further include a network interface device 1208 for connecting to the LAN, intranet, internet, and/or the extranet. The computer system 1200 also may include a video display unit 1210 (such as a liquid crystal display (LCD) or a cathode ray tube (CRT)), an alphanumeric input device 1212 (such as a keyboard), a cursor control device 1214 (such as a mouse), a signal generation device 1216 (such as a speaker), and a graphic processing unit 1224 (such as a graphics card).

The data storage device 1218 may be a machine-readable storage medium 1228 (also known as a computer-readable medium) on which is stored one or more sets of instructions or software 1222 embodying any one or more of the methods or functions described herein. The instructions 1222 may also reside, completely or at least partially, within the main memory 1204 and/or within the processing device 1202 during execution thereof by the computer system 1200, the main memory 1204 and the processing device 1202 also constituting machine-readable storage media.

In one implementation, the instructions 1222 include receiving instructions for receiving a plurality of frames of an input video for extracting a feature vector of a motion in the plurality of frames at block 1102 of FIG. 11. The instructions 1222 may further include generating instructions 1234 for generating a plurality of sets of one or more motion component bits based on the feature vector and a plurality of classifiers, the plurality of sets corresponding to the plurality of classifiers, each set of one or more motion component bits representing a physical or mechanical attribute of the motion at blocks 1108, 1110, and/or 1112 of FIG. 11. The instructions 522 may further include controlling instructions 1136 for extracting a feature vector of a motion in the plurality of frames at block 1104 of FIG. 11, passing the feature vector through a plurality of classifiers at block 1108 of FIG. 11, and/or inserting the single feature vector into an artificial neural network (ANN) and produce a final verb class probability distribution of the motion from the ANN based on the single feature vector at block 1114 of FIG. 11. While the machine-readable storage medium 1218 is shown in an example implementation to be a single medium, the term "machine-readable storage medium" should be taken to include a single medium or multiple media (such as a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media. The term "machine-readable storage medium" shall accordingly exclude transitory storage mediums such as signals unless otherwise specified by identifying the machine readable storage medium as a transitory storage medium or transitory machine-readable storage medium.

In another implementation, a virtual machine 1240 may include a module for executing instructions such as receiving instructions 1232, generating instructions 1234, and/or modifying instructions 1236. In computing, a virtual machine (VM) is an emulation of a computer system. Virtual machines are based on computer architectures and provide functionality of a physical computer. Their implementations may involve specialized hardware, software, or a combination of hardware and software.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "modifying" or "providing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices. The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (such as a computer). For example, a machine-readable (such as computer-readable) medium includes a machine (such as a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for motion recognition and embedding, comprising:
   receiving a plurality of frames of an input video for extracting a feature vector of a motion in the plurality of frames;
   generating a plurality of sets of one or more motion component bits based on the feature vector and a plurality of classifiers, the plurality of sets corresponding to the plurality of classifiers, a first set of one or more motion component bits representing a time-based physical or mechanical attribute of the motion;
   generating a motion code corresponding to the motion of the input video based on the plurality of sets of one or more motion component bits; and
   communicating the motion code to a machine to execute an action by combining the plurality of sets of one or more motion component bits.

2. The method of claim 1, wherein the plurality of classifiers comprise an interaction type, an active trajectory type, and a passive trajectory type.

3. The method of claim 2, wherein the interaction type indicates whether the motion is a contact motion,
   wherein the contact motion comprises an engagement type and a contact duration type,
   wherein the engagement type indicates whether the contact motion causes deformation on an object, and
   wherein the contact duration type indicates whether the contact motion persists for a predetermined period of time.

4. The method of claim 2, wherein the active trajectory type comprises a prismatic type, a revolute type, and a recurrence type,
   wherein the prismatic type indicates whether the motion is along a single axis, a plane, or a manifold space,
   wherein the revolute type indicates whether the motion is rotational, and
   wherein the recurrence type indicates whether the motion is cyclical.

5. The method of claim 2, wherein the passive trajectory type indicates whether the motion is with a passive object.

6. The method of claim 1, wherein the generating the motion code comprises combining the plurality of sets of one or more motion component bits in an ordered sequence.

7. The method of claim 1, wherein the motion code comprises a binary encoded string for a machine to execute the motion.

8. The method of claim 1, further comprising:
   selecting a highest probability value in a verb class of the motion; and
   generating a probability distribution vector for the verb class of the motion based on the extracted feature vector and the highest probability value.

9. The method of claim 8, further comprising:
   combining the probability distribution vector and the motion code into a single feature vector.

10. The method of claim 9, further comprising:
    inserting the single feature vector into an artificial neural network (ANN); and
    producing a final verb class probability distribution of the motion from the ANN based on the single feature vector.

11. The method of claim 1, further comprising:
    incorporating a semantic feature of an object into the motion into the feature vector; and
    incorporating the semantic feature into the plurality of classifiers.

12. The method of claim 1, wherein the machine performs an emulating motion corresponding to the motion of the input video, based upon the motion code.

13. The method of claim 1, wherein the machine performs a consequential action as a result of the motion code.

14. An apparatus for motion recognition and embedding, comprising:

a processor; and a memory communicatively coupled to the processor, wherein the processor and the memory are configured to:

receive a plurality of frames of an input video for extracting a feature vector of a motion in the plurality of frames;

generate a plurality of sets of one or more motion component bits based on the feature vector and a plurality of classifiers, the plurality of sets corresponding to the plurality of classifiers, each set of one or more motion component bits representing a physical or mechanical attribute of the motion, wherein the plurality of classifiers comprise an interaction type, a prismatic type, a revolute type, a recurrence type, and a passive trajectory type, wherein the prismatic type indicates whether the motion is along a single axis, a plane, or a manifold space, wherein the revolute type indicates whether the motion is rotational, and wherein the recurrence type indicates whether the motion is cyclical; and generate a motion code for a machine to execute the motion by combining the plurality of sets of one or more motion component bits.

15. The apparatus of claim 14, wherein the generating the motion code comprises combining the plurality of sets of one or more motion component bits in an ordered sequence.

16. The apparatus of claim 14, wherein the processor and the memory are further configured to:

select a highest probability value in a verb class of the motion; and generate a probability distribution vector for the verb class of the motion based on the extracted feature vector and the highest probability value.

17. The apparatus of claim 16, wherein the processor and the memory are further configured to:

combine the probability distribution vector and the motion code into a single feature vector.

18. The apparatus of claim 17, wherein the processor and the memory are further configured to:

insert the single feature vector into an artificial neural network (ANN); and produce a final verb class probability distribution of the motion from the ANN based on the single feature vector.

19. The apparatus of claim 14, wherein the generating the motion code comprises generating the motion code based on an objective function ($L_M$):

$$L_M = -\Sigma_{k=1}^{5} \Sigma_{l=1}^{C_k} \lambda_k m_l^k \log(f_l^k(x)),$$

where $\lambda_k$ is a constant weight and $m_l^k$ is a $l^{th}$ element of a ground truth on-hot vector for a kth set of the one or more motion component bits.

20. The apparatus of claim 14, wherein the processor and the memory are further configured to:

incorporate a semantic feature of an object into the motion into the feature vector; and incorporate the semantic feature into the plurality of classifiers.

21. A method for motion recognition and embedding, comprising:

receiving a plurality of frames of an input video for extracting a feature vector of a motion in the plurality of frames;

generating a plurality of sets of one or more motion component bits based on the feature vector and a plurality of classifiers, the plurality of sets corresponding to the plurality of classifiers, each set of one or more motion component bits representing a physical or mechanical attribute of the motion;

generating a motion code corresponding to the motion of the input video based on an objective function ($L_M$): $L_M = -\Sigma_{k=1}^{5} \Sigma_{l=1}^{C_k} \lambda_k m_l^k \log(f_l^k(x))$, where $\lambda_k$ is a constant weight and $m_l^k$ is a $l^{th}$ element of a ground truth on-hot vector for a kth set of the one or more motion component bits; and communicating the motion code to a machine to execute an action by combining the plurality of sets of one or more motion component bits.

* * * * *